March 5, 1968  M. RASPANTI  3,372,381
DIGITAL COMPUTER TEACHING MACHINE
Filed Jan. 6, 1965  22 Sheets-Sheet 1

INVENTOR
M. RASPANTI
BY
Howard R. Popper
ATTORNEY

March 5, 1968  M. RASPANTI  3,372,381
DIGITAL COMPUTER TEACHING MACHINE
Filed Jan. 6, 1965  22 Sheets-Sheet 2

March 5, 1968 M. RASPANTI 3,372,381
DIGITAL COMPUTER TEACHING MACHINE
Filed Jan. 6, 1965 22 Sheets-Sheet 3

March 5, 1968     M. RASPANTI     3,372,381

DIGITAL COMPUTER TEACHING MACHINE

Filed Jan. 6, 1965     22 Sheets-Sheet

March 5, 1968     M. RASPANTI     3,372,381
DIGITAL COMPUTER TEACHING MACHINE
Filed Jan. 6, 1965     22 Sheets-Sheet March 5, 1968  M. RASPANTI  3,372,381
DIGITAL COMPUTER TEACHING MACHINE
Filed Jan. 6, 1965  22 Sheets-Sheet 11

March 5, 1968 M. RASPANTI 3,372,381
DIGITAL COMPUTER TEACHING MACHINE
Filed Jan. 6, 1965 22 Sheets-Sheet 12

FIG. 14   SCANNER REGISTER CIRCUITS

March 5, 1968 M. RASPANTI 3,372,381
DIGITAL COMPUTER TEACHING MACHINE
Filed Jan. 6, 1965 22 Sheets-Sheet 18

TRANSFER LOGIC

GATING LAMPS

March 5, 1968 M. RASPANTI 3,372,381
DIGITAL COMPUTER TEACHING MACHINE
Filed Jan. 6, 1965 22 Sheets-Sheet 22

REGISTER LAMPS

NETWORK DISPLAY

United States Patent Office 3,372,381
Patented Mar. 5, 1968

3,372,381
DIGITAL COMPUTER TEACHING MACHINE
Matthew Raspanti, Lincroft, N.J., assignor to Bell Telephone Laboratories, Incorporated, New York, N.Y., a corporation of New York
Filed Jan. 6, 1965, Ser. No. 423,693
10 Claims. (Cl. 340—172.5)

ABSTRACT OF THE DISCLOSURE

A word-organized stored program digital computer having a block diagram display unit which visually displays the states of various of the internal elements of the computer and various of the external equipments controlled by the computer. In the context of this disclosure, the computer controls a telephone switching system. The computer operates at a slow rate, and can even be stopped during execution of instructions, so that the visual display can be utilized as a teaching tool.

---

This invention relates to teaching machines and more particularly to machines for teaching both the programming and the operation of stored program controlled machinery such as may be found in high speed general purpose digital computers and in stored program controlled communications switching systems.

Despite an educational background in science or engineering, considerable difficulty is usually encountered by those undertaking the study of stored program controlled systems in acquiring a rational apprehension of the correlation between the esoteric program format statements fed into the machine and the steps leading to the tangible results achieved through the execution of these instructions. While conventional teaching tools tend to be inadequate for this purpose, the use of a commercial computer for demonstrations does not provide an adequate solution because the machine tends to overwhelm the novice with its speed and complexity. The fact that the internal information processing subassemblies of commercial digital computers are generally inaccessible creates a still further barrier to the achievement of this understanding. The need has accordingly been perceived for a stored program digital computer teaching machine capable of operating at speeds and in a manner more directly related to the educational needs of the student than to the data processing rate expected of a commercial calculator designed to process a great amount of data in a minimal amount of time.

Accordingly, it is an object of the present invention to provide a word-organized digital computer especially constructed so as to be operable almost from the outset by a novice programmer and which is arranged to demonstrate to the student the significance of the steps he has taken in directing its operation.

Another object of the present invention is to provide a teaching machine for digital computer programming which affords a sufficiently comprehensive repertory of programming instructions to challenge the intellectual capabilities of programming students.

It is still another object of the present invention to provide a machine which simulates the operation of a large, complex commercial computer on an economical and compact basis.

The foregoing objects are achieved in one illustrative embodiment of the present invention by operating an animated block diagram display of the internal information processing elements of a stored program controlled system, selectively, in accordance with the information contained in, moving about, and acted upon by the tutorially significant information processing subassemblies of the system. The functioning of the computer is controlled by a multiphase clock which selectively supplies operating grounds to the order word decoder in such a manner that the constituent steps of each order are executed during sufficiently diverse times to permit the information contents of, and information flow among, the computer's internal elements to be observed for a tutorially significant interval. In addition, a diagram of a communications switching network which represents the tangible product of the instruction processing executed by the machine is provided so that the information content of the general purpose registers of the computer may be given in an environment familiar to the particular class of programming students being instructed.

In the illustrative embodiment of the present invention the internal information processing elements are depicted following the format laid down in the central control circuitry of the copending application of A. H. Doblmaier, R. W. Downing, M. P. Fabisch, J. A. Harr, H. F. May, J. S. Nowak, F. F. Taylor and W. Ulrich, Ser. No. 334,875, filed Dec. 31, 1963. For tutorial purposes, however, a number of departures have been made. Since the present invention is concerned with the education of programming students, a number of displays controlled by the stored program techniques being demonstrated have been supplied. The displays as well as the internal information processing elements of the system are accordingly selectively controllable in accordance with a plurality of especially predetermined program order words. Thus, in addition to accomplishing the usual logical and arithmetic functions expected of a stored program digital computer, the apparatus of the present invention executes programmable display instructions which are designed to convey to the student the significance of the steps which his instructions have ordered the machine to execute. A plurality of general purpose registers is provided whose memory elements control respective lamps to indicate their respective information contents. Different combinations of the memory elements of these general purpose registers are connected via switches selected and operated in accordance with program instructions to control the operation of a communication network switching display. Individual bits of these general purpose registers may be selectively masked to control functions in the communications display network which have tangible communication switching significance. The general purpose registers are arranged so that each controls a corresponding portion of the communication switching network functions.

According to one aspect of the present invention, apparatus is provided for executing a plurality of unique network display control instructions. Four such instructions are available for use with the communication switching network display and four corresponding instructions are available for use with a general information display. The first of these instructions places the network display selectively under the control of one of the general purpose registers after performing an optional logical function based on the information content of another of the general purpose registers. In the list of instruction formats hereinafter described, display instructions having the letter P in the format statement control the apparatus to compute the logical product of data information contained in the statement with the contents of the specified one of the general purpose registers. Instructions in the table appearing hereinafter containing the letter U in the instruction format statement compute the logical union function of the data specified in the format statement with the information contained in the general purpose register specified in the statement. Output display orders containing the letter S in the format statement operate apparatus which prevents the computer from advancing to the next order in the program store until manually commanded to do so by the instructor or student operating a cord switch for this purpose.

According to another aspect of the present invention, apparatus is provided for responding to transfer instructions not only to alter the address contained in the program addressing circuitry to find the next instruction out of the normal sequence in which they are stored in the program memory, but also to selectively remove predetermined ones of the displays. In this manner network operations controlled by the stored program central control apparatus may be selectively studied as they are undergoing changes without the need manaually to disconnect the functional subassemblies responsible for the execution of the instructions.

It is a feature of the present invention that a stored program controlled information processing system contain a plurality of general purpose registers which normally display their own information contents and which, at program order determined times, animate a tutorial display corresponding to prearranged combinations of the information bits displayed in these registers.

It is another feature of the present invention that a stored program controlled information processing system provide means for selectively releasing the animated tutorial display from the control of the prearranged groupings of register display bits in accordance with programmable instructions therefor.

It is another feature of the present invention that a stored program controlled information processing system be provided to execute a variety of display orders, logically related to the contents of the program order and of specified ones of the general purpose registers.

The foregoing and other objects and features may become more apparent by referring now to the following detailed description and drawing in which:

FIGS. 1 and 2, taken together with FIG. 3 show an illustrative embodiment of a stored program controlled information processing system which is selectively animated in accordance with program instruction for tutorial purposes;

Figure 1:
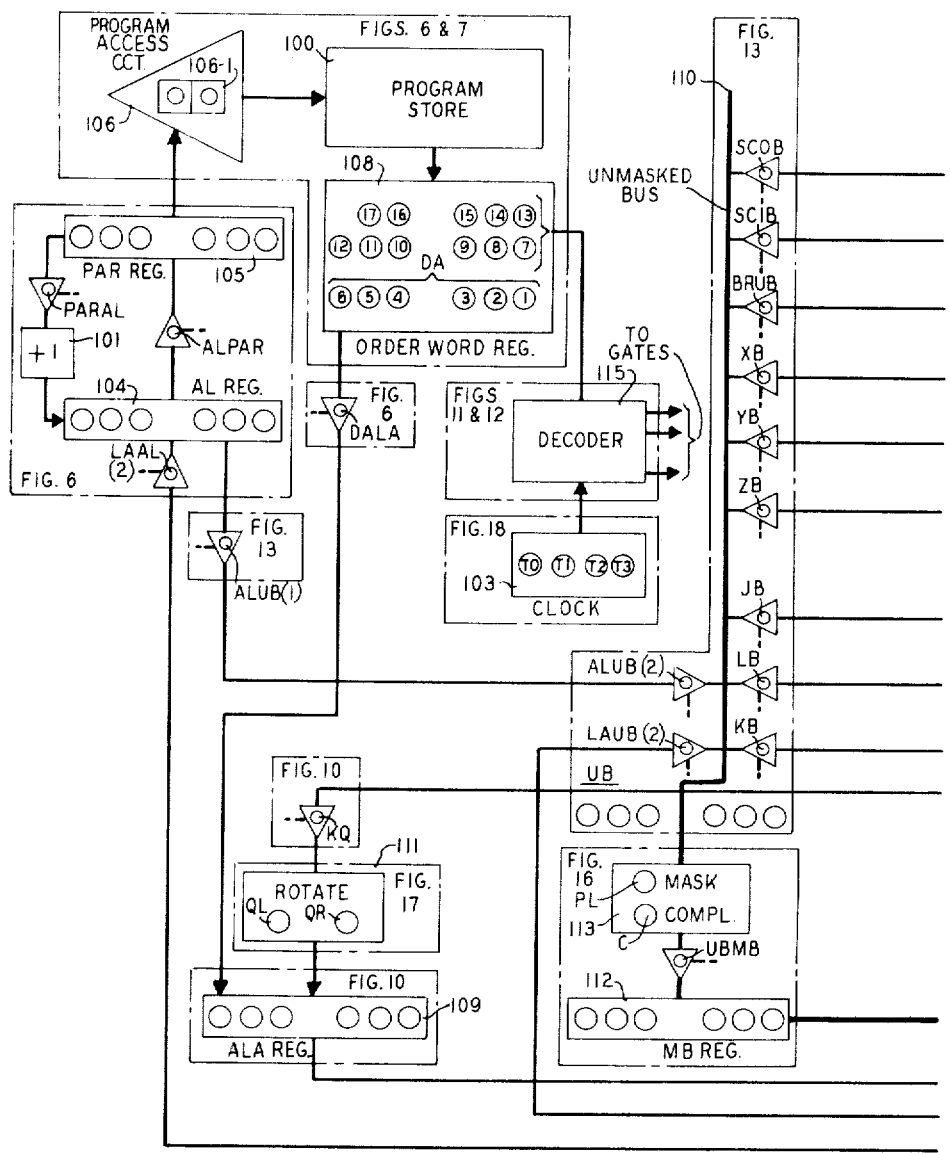
Figure 2:
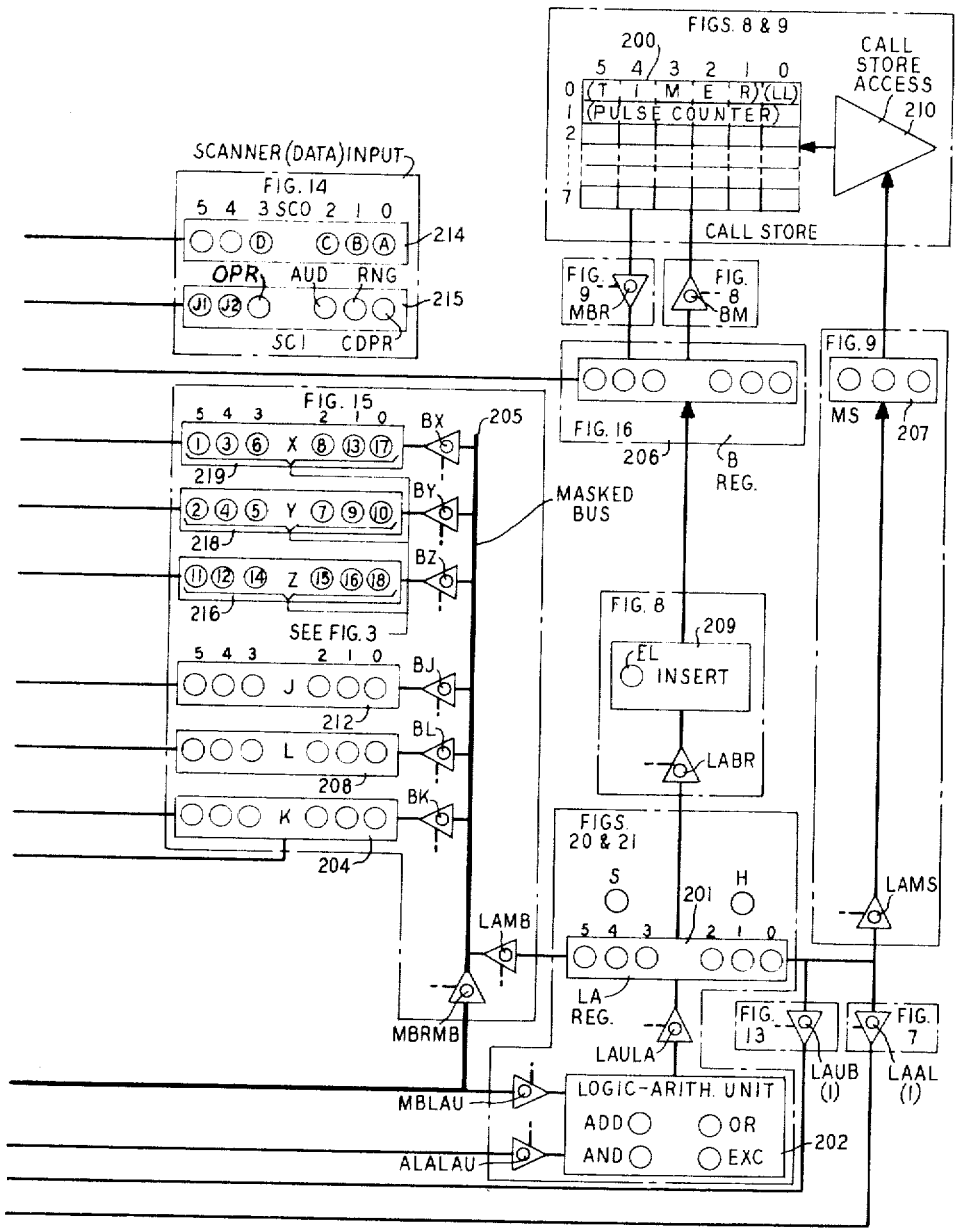
Figure 4:
FIG. 4 shows how FIGS. 1 and 2 should be arranged.
Figure 5:
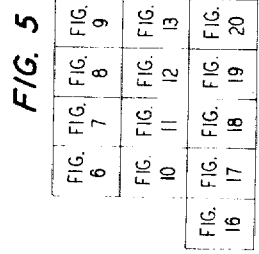
FIG. 5 shows how FIGS. 6 through 22 should be arranged to depict one specific illustrative embodiment of my invention.

Referring now to FIGS. 1 and 2, there is presented the illustrative embodiment of the animated block diagram display of the internal information processing elements of the stored program control system of the present invention. The block diagram is arranged so that each functional subassembly of the stored program control system contains lamp displays which permit the transfer, processing, and contents of information contained in the system to be observed and studied from the programming viewpoint. To illustrate the operation of the block diagram in demonstrating an illustrative computer program, a program for processing calls in an electronic communications switching system will hereinafter be described.

Figure 3:
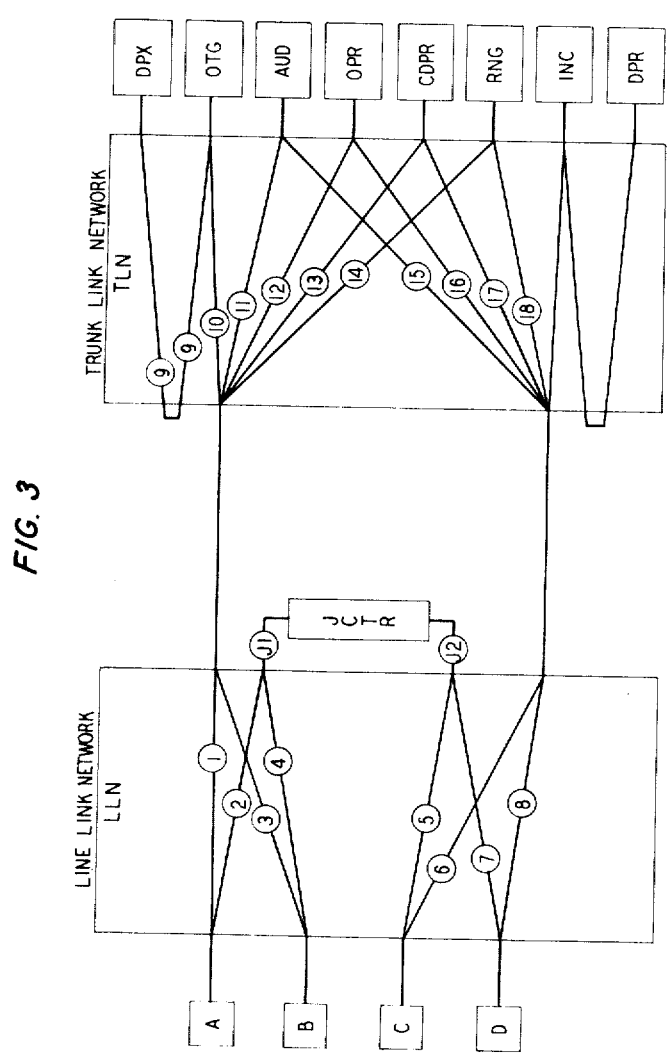

The basic structural elements of the communication switching system which is controlled by the information processing unit of FIGS. 1 and 2 are shown in FIG. 3. Telephone subscriber stations are schematically indicated at letters A, B, C, and D at the left of the line link network LLN. Trunk equipment is indicated at the right of the trunk link network TLN. Paths within the line link network are given display lamp numbers 1 through 8 and those within the trunk link network are given display lamp numbers 9 through 18. The information processing equipment of the program controlled circuitry will ascertain the state of each of the telephones at A through D and control the states of the connections indicated at display lamps 1 through 18. All of the circuit conditions are representable in binary form. Thus, telephone sets A through D are, at any time, each either on-hook or off-hook, and the paths 1 through 18 are, at any time, idle or busy. Their instantaneous states accordingly can be represented by the binary digits 0 and 1. To emphasize the correlation between these elements of FIG. 3 and the binary contents of the general purpose registers X, Y, and Z, and of the scanner (data) input registers SC0 and SC1 in FIG. 2, the information display lamps of these registers have been numbered to correspond to the similarly lettered and numbered equipments and paths of FIG. 3. In accordance with the operation of the illustrative embodiment, the registers of FIGS. 1 and 2 always display their instantaneous information contents whereas the information display lamps of FIG. 3 are selectively controlled in accordance with the stored program to indicate the specially grouped contents of the information of the SC0, SC1, and X, Y, and Z registers only at program order determined times. Thus, scanner register SC0 has its 0, 1, 2, and 3 bit positions labeled A, B, C, and D, respectively, corresponding to the four telephone stations shown on FIG. 3. Scanner register SC1, on the other hand, has its bit positions 0 through 5 labeled respectively CDPR, RNG, AUD, OPR, J2, and J1. The 0 through 5 display lamp bit positions of X register 219 correspond to network paths 17, 13, 8, 6, 3, and 1. Display lamp bit positions 0 through 5 of the Y register 218 control respectively paths 10, 9, 7, 5, 4, and 2. Display lamp bit positions 0 through 5 of the Z register 216 control respectively network paths 18, 16, 15, 14, 12, and 11. Accordingly, it is seen that the SC0 register 214 monitors the state of telephone stations A through D. Likewise, SC1 register 215 monitors the state of the control trunks connected to the trunk link network and the junctor connected to the line link network. X register 219 determines the state of the line link network paths from telephone stations to the trunk link network and also the trunk link network paths for the customer's dial pulse register CDPR. Y register 218 determines the states of the line link network paths for connecting the telephone stations to the junctor and the trunk link network paths for the dial pulse transmitter and the outgoing trunks. Register Z determines other miscellaneous trunk link network paths.

Of the registers so far discussed, it should be pointed out that registers SC0 and SC1 are the so-called scanner registers, the individual bits of which are instantaneously controlled by the corresponding states of the monitored apparatus. Accordingly, the SC0 and SC1 registers represent the data input to the system. On the other hand, the contents of the X, Y, and Z registers, as instructed by the stored program hereinafter to be described, represent the control output of the system. With the input and the output of the system thus defined in relationship to a system having a physical existence apart from the general purpose information processing element of the system shown in FIGS. 1 and 2, the operation of the program controlled circuitry may now be explained.

The list of program orders capable of being executed by the information processing system shown in FIGS. 1 and 2 are given below in Table I of the Appendix hereto which lists the symbolic designation of the order and the corresponding binary form thereof. It will be seen that the binary format of each order is a 17-bit word. Bits 1 through 6 of the orders are typically used for designating the data address portion and the letter symbol w in the table for any order is to be translated into a 1 or a 0 in accordance with the particular data address to be designated. The symbols p, e, j, i and c similarly are to be replaced by binary 1's or 0's in accordance with the option specified in the instructiton format statement. The instruction format statements are defined in Tables III, IV and V. The letters r1 through r6 and the letter t are to be replaced as shown in Table II.

In an illustrative embodiment of the invention, program store 100 contains 4 punched cards, each having 11 rows and 17 columns. For each such card in the program store, there is a corresponding 11 x 17 array of switches, one switch for each hole position on a card. When a card is inserted in its corresponding array of switches, it causes the switches to remain open where holes have been punched in the card and to be closed where no holes have been punched. The illustrative program store has a capacity, accordingly, of 44-word locations. The selection of a particular word location is made by program access circuit 106 in accordance with a 6-bit word furnished it by program address register 105. The decimal equivalent of the binary address furnished by program address register 105 is displayed in octal display 106-1. This supplements the binary display of the address exhibited on the six register bit display lamps of program address register 105.

The order word read out of program store 100 is registered in order word register 108. The register bit display lamps of order word register 108 are numbered each to correspond to a particular bit of the order word. As shown in FIG. 1, bits 1 through 6 of order word register 108 are grouped as the data address, "DA" bits. These bits are transferred to ALA register 109 when gate DALA is enabled. Bits 7 through 17 of the order word are transferred from order word register 108 to decoder 115, at the same time that gate DALA is activated. The transfer of information among the various functional subassemblies illustrated in FIGS. 1 and 2 and the operation of each of these subassemblies is controlled by decoder 115 which executes the instructions furnished it by the order word register under control of clock 103. Clock 103 furnishes operate signals to decoder 115 during each of four time phases T0 through T3. The existence of a particular time phase is indicated by the illumination of the correspondingly designated clock phase indicator lamp. The manner in which the particular clock phases control the decoder in turn to control the gates transferring information between functional subassemblies so that the operation thereof is meaningful to the student may become more apparent from the description of an illustrative program sequence. Before embarking on this description, a brief outline of the functional subassemblies depicted in FIGS. 1 and 2, which have not yet been mentioned, may be of some assistance.

The above-referred to program address register 105 is connected by gate PARAL to add-one logic circuit 101 which in turn is connected to AL register 104. Add-one logic circuit increments the count existing in program address register 105 by 1 to furnish AL register 104 the address of the next instruction. Alternatively, AL register 104 may, on a subsequent phase of clock 103, have gate LAAL(2) activated to furnish it with an address from LA register 201 (FIG. 2) in accordance with instructions contained in the program order statement. During the appropriate phase of clock 103, gate ALPAR is activated to insert the correct address in program address register 105.

As mentioned above, ALA register 109 receives the address portion of the instruction from order word register 108. On another phase of clock 103, gate KQ may be activated to insert the contents of K register 204 into rotate logic circuit 111. On this phase of clock 103 ALA register 109 will have the contents of the K register, as modified by the state of rotate logic circuit 111, entered into it. Accordingly, ALA register 109 serves the dual purpose of receiving the output of order word register 108 or the output of rotate logic circuit 111.

Also shown in FIG. 1 is unmasked bus 110 which contains 6 conductors to enter the contents of any of registers SC0, SC1, B, X, Y, Z, J, L, K of FIG. 2 into masked bus register 112, depending upon which of the associated gates SC0B, SC1B, BRUB, XB, YB, ZB, JB, LB, or KB is activated on the appropriate phase of clock 103. Unmasked bus 110 also may receive the output of AL register 104 when gates ALUB(1) and ALUB(2) are activated. In addition, unmasked bus 110 may receive the output of LA register 201 under program orders directing the activation of gates LAUB(1) in FIG. 2 and LAUB(2) in FIG. 1. Each of the X, Y, Z, J, L, and K registers of FIG. 2 are available for general program purposes and registers X, Y, and Z are available for operating the tutorial display of FIG. 3, as alluded to above, and to be more particularly described hereinafter. Registers SC0 and SC1 are data input registers the status of each of which is determined by the states of the supervised lines and trunk circuits of FIG. 3, or alternatively, by a plurality of individual selection keys shown in FIG. 6.

The contents of MB register 112 and ALA register 109 are inserted into logic arithmetic unit 202 by the activation of gates MBLAU and ALALAU, respectively. Logic arithmetic unit 202 performs the logic functions of arithmetic addition, logical product, logical union or exclusive union as instructed by the program order word and illuminates its correspondingly designated one of display lamps ADD, AND, OR, or EXC. The result of the operations performed by logic arithmetic unit 202 are entered into LA register 201 upon the activation of gate LAULA. As instructed by the program order word, LA register 201 may have its contents entered into masked bus 205 by the activation of gate LAMB. Alternatively, the contents of LA register 201 may be selectively entered into B register 206 by the activation of gate LABR, into memory select register 207 by the activation of gate LAMS, into unmasked bus 110 by the activation of gates LAUB (1,2), or into AL register 104 by the activation of gates LAAL(1,2). Under control of the program order word, insertion logic circuit 209 may be selectively activated to modify the word being entered into the B register 206 in accordance with the information in L register 208. For each bit position of the L register in which a binary 1 is stored, the corresponding bit contained in LA register 201 is gated into the corresponding position of B register 206 remains unchanged. The existence of the binary 0 is stored, the corresponding bit position of B rebister 206 remains unchanged. The existence of the insertion instruction in a program order is indicated by the illumination of display lamp EL of insertion logic circuit 209 whenever the insertion logic circuit is called into operation on the appropriate phase of clock 103.

The activation of gate LAMS conveys only the information stored in bit positions 0, 1, and 2 of LA register 201 into memory select register 207. Only three bits are required in the illustrative embodiment because call store 200 has a capacity for only eight words. The binary address contained in memory select register 207 is transferred to call store access circuit 210 to select the corresponding word stored in the call store. It will be observed that the 0 bit of word 0 in call store 200 is designated as the "last look'" memory spot and is given the designation (LL) in the drawing. Similarly, bit positions 1 through 5 of word 0 are designated "timer" and the 6-bit positions of word 1 are designated "pulse counter." The significance of these designations will become more apparent in the description of the illustrative call processing program following hereinafter.

While the arrangement of the functional subassemblies depicted in FIGS. 1 and 2 has become apparent from the above discussion, the programming student must be enabled to take the steps required to correlate the program format statements such as those shown in Table I, which statements to the novice programmer appear more or less esoteric, with the functioning of the apparatus indicated in FIGS. 1, 2 and 3.

To assist the programming student in accomplishing this transitional phase of his education a number of special program display instructions are available to be specified by the programming instructor who may also selectively control the operation of the functional subassemblies of FIGS. 1 and 2 by manually controlling the operation of clock 103. With equally advantageous results the programming student himself may exert the same control as the programming instructor would exert for demonstration purposes.

Other departures from practices which would be followed in implementing conventional computer technology to arrive at a machine capable of processing large amounts of data in a short time for high speed computational purposes, but which are unsuited for tutorial purposes, may now become apparent from a inspection of FIGS. 1 through 3. For example, it will be noted that the program address register has a 6-bit capacity theoretically capable of designating 64 program words in program store 100, whereas the call store 200 has capacity for only 8 data words. Since the object of the present apparatus is to familiarize the student with stored program control rather than to process vast amounts of data, the machine has been designed to afford great flexibility in demonstrating examples of programming statements and in maintaining the distinction between the programming instructions and data words, thus obviating one of the confusing aspects of general purpose computers in which the general memory serves to store both program instructions and data words.

Another aspect of the illustrative embodiment shown in FIGS. 1 and 2 is the manner in which the operation of program address register 105 is implemented, on the one hand, automatically by the gating of the output of add-one logic circuit 101 into AL register 104, and, on the other hand, under program control by the gating of the output of LA register 201 into AL register 104. The demonstration of the execution of these alternative methods of address computation on distinct phases of clock 103 serves the tutorial purpose of enabling the student to grasp these distinct concepts of instruction address computation.

One of the salient tutorial aspects of the present invention, briefly alluded to above, was flexibility in demonstrating a variety of program instructions besides affording the student the opportunity to observe the operation of the various functional subassemblies of FIGS. 1 and 2. During the execution of conventional program instructions, the apparatus of the present invention is programmable selectively to display its control of the communications switching network of FIG. 3. To accomplish this function, instructions which may be symbolically represented as PWN(R) and UWN(R) are provided. The binary format of the statement is given in Table I and the execution description of the statement is given in Table III. The presence of a variable element in the symbolic order column of Table I is indicated by placing that element in parentheses. In the symbolic order PWN(R) the variable element R is to be replaced by specifying one of registers X, Y, Z, or K. In the binary order format of this instruction the particular register desired is designated by the values of $r2$ in bit positions 13 and 14, as indicated in Table II. In Table V the symbolic order PWN(R) is illustrated in the form PWN$\underline{X}$. Also indicated in the execution description, Table V, are the letters D2, R3 which indicate respectively a data word that may be inserted in bit positions 1 through 6 of the order and an index register which may be specified by the values of $r6$ in bit positions 10 and 11 of the binary order Table I. The order UWN$\underline{X}$ is similarly represented in Table V. The difference between orders PWNX and UWNX is that the former computes the logical product of the word specified at D2 (bits 1-6 of the binary order format) with the contents of the index register specified at R3 and inserts the result in register X, whereas the latter executes the OR function with the contents of the data word at D2 and the contents of the index register at R3, entering the results of the logical union into the X register. If the order PWNK D2, R3 is specified, the logical product of D2 with the contents of R3 replaces the contents of the K register, but the contents of the X register remains unchanged. As indicated in Table V, specifying the X or K register in the symbolic order causes the X register to exert control over the network. On the other hand, specifying registers Y or Z in the symbolic format will cause the respectively designated Y or Z register to control the network.

Once the network display has been placed under the control of the X, Y, or Z register it remains so until control is removed by an order of the TUN type. This serves the important tutorial function of allowing the X, Y, and Z registers to continue serving their general purpose functions, at the same time displaying their information contents under the control of clock 103. However, since their contents do not always represent network display functions, these registers are isolated from the network display by the TUN type of order. Accordingly, the student and instructor are provided with a method of checking, in a tangible manner, the contents of the X, Y, and Z registers at appropriate points in the program to see whether their contents corresponds to the desired type of control over the network. The significance of the manner in which the apparatus of the illustrative embodiment executes the instructions of Table I may become more apparent by referring to a sample call processing program designed to activate the display of FIG. 3 at appropriate points in the program where instructions having network significance can be suitably demonstrated.

The above-referred to display instruction PWN(R) will now be described for the case wherein the binary variable (R) is replaced to specify register X as the ultimate repository of the information. During phase T0 of clock 103, the address in program store 100 of the instant instruction is inserted into program address register 105 as indicated by the illumination of gate display lamp ALPAR and the address information is inserted into program store access circuit 106. Program store access circuit 106, in response to the receipt of the address, causes program store 100 to insert the order word corresponding to the address into order word register 108. The DA portion of the order word comprising bits 1 through 6 is inserted into ALA register 109 and gate display lamp DALA is illuminated. Let it be assumed that the data word and index register specified with the instruction are 111100, K, respectively. The ALA register display lamps will be illuminated to display the pattern 111100. Gate display lamp KB will be illuminated and the contents of K register 204 will be gated onto unmasked bus 110. The contents of the K register bits will be displayed on display lamps UB. Simultaneously, gate display lamp UBMB will be illuminated and the unmasked bus will be connected to MB register 112 and the display lamps of the latter register will display the contents of the K register. Also during T0, gate display lamps MBLAU and ALALAU will be illuminated, indicating the transfer of the contents of the MB register 112 and the ALA register 109, respectively, into logic arithmetic unit 202. Display lamp AND of logic arithmetic unit 202 will be illuminated to indicate the forming of the logical product of the contents of the ALA and MB registers. This logic product is entered into LA register 201 as indicated by the illumination of gate display lamp LAULA. LA register 201 will now display on its display lamps the logical product of the contents of the ALA and MB registers.

During clock phase T1, the contents of LA register 201 is gated to unmasked bus 110 as indicated by the illumination of gate display lamps LAUB(1,2). The unmasked bus is connected to the MB register as indicated by the illumination of gate display lamp UBMB and the content of the LA register accordingly appears in MB register 112.

During clock phase T2, the ALA register 109 contains no information inasmuch as it is released following the T0 phase. The contents of the MB register 112 is gated into logic arithmetic unit 202 as indicated by the illumination of gate display lamp MBLAU. In addition, display OR of logic arithmetic unit 202 is illuminated to indicate the logical union function of the contents of the ALA register 109 and MB register 112. The result of this logical union, i.e., the contents of the MB register unchanged, is entered into LA register 201 as indicated by the illumination of gate display lamp LAULA.

During clock phase T3, the contents of LA register 201 is gated into X register 219, as indicated by the illumination of gate display lamps LAMB and BX. In addition, the S and H display lamps are set according to the sign bit of LA register 201 and according to the homogeneity of the information contained in the LA register. When the information is entered into the X register, display NO is illuminated. Display NO comprises paths 1, 3, 6, 8, 13, and 17 in FIG. 3. These displays are selectively illuminated in accordance with the contents of bits 0, 1, 2, 3, 4, and 5 of the X register.

From the foregoing description of the display instruction PWN(R) on the various phases of clock 103, it is seen that on clock phase T0 the student is shown how an instruction address is utilized to call an instruction from the program store, how the specification of an index register results in the contents of that register being entered into MB register 112, and how the DA portion of an order word is entered into ALA register 109. These functions are common to all orders executed by the apparatus of the illustrative embodiment. In addition, during the T0 phase of clock 103 occurring during the execution of the PWNX type of order, the student is shown how the specifying of an index register (index register K in the illustrative example) results in the contents of that register being entered into MB register 112 preparatory to forming the logical product in logic arithmetic unit 202 of that information with the contents of the ALA register. The student is also shown how, on phase T1, the contents of program address register 105 is incremented by the operation of add-one logic circuit 101 and how the incremented result is placed in AL register 104. This operation occurs on all orders executed by the illustrative embodiment. In addition, during the T1 phase of the execution of the PWN(R) type of order, the student is shown how the contents of the LA register is restored to the MB register preparatory to forming the logical union on the ensuing clock phase, T2, of the contents of the MB register and the ALA register. This display of the internal processing by the functional subassemblies on tutorially distinct phases of clock 103 demonstrates to the student how the various functional subassemblies may be reused for entirely different purposes on different clock phases.

During clock phase T3, the student is shown, by the illumination of the aforementioned displays, how the information in the LA register is entered into the X register and, simultaneously, the control which the X register exerts upon the network display of FIG. 3.

As mentioned above, once the network display of FIG. 3 has been placed under control of any of registers X, Y, or Z of FIG. 2, the network remains under control of that register unless an order is executed to divorce the network from such control. The provision of structure to execute such "undisplay" instructions is a significant tutorial function of the instant apparatus inasmuch as the X, Y, and Z registers (as well as the K register, if so specified) continue to display their instantaneous information contents on subsequent phases of clock 103, while the network of FIG. 3 is divorced from control of these registers until they contain information proper to be displayed. In this manner, the X, Y, and Z registers may be employed for general information processing during all phases of clock 103. However, when required by the specification of a PWN(R) type of order, the appropriate register will control its corresponding paths in FIG. 3. Thereafter, the execution of a TUD type of order will divorce these registers from control of the network so that they may be used for general information processing purposes.

The execution of the TUD type of order is accomplished on respective phases of clock 103 as follows: during phase T0, the above-mentioned functions which are generic to the execution of all orders are accomplished. In addition, the contents of ALA register 109 and the contents of MB register 112 are gated into logic arithmetic unit 202 as demonstrated by the illumination of gate display lamps ALALAU and MBLAU, respectively. At this time, display lamp ADD of logic arithmetic unit 202 is illuminated to demonstrate that it is forming the arithmetic sum of the contents of the MB and ALA registers. The result of the operation of logic arithmetic unit 202 is entered into LA register 201, as demonstrated by the illumination of gate display lamp LAULA.

The significance of the steps executed during phase T0 of the TUN type of order is that the data word indicated at A2 in the execution description of the statement is arithmetically added to the contents of the index register indicated at R1 in the execution description of the statement. This arithmetic sum of data address plus contents of index register is given the symbolic designation ρ. During clock phase T1, the contents of AL register 104 is gated to unmasked bus 110 as indicated by the illumination of gate display lamps ALUB(1,2) and the information on the unmasked bus is gated into MB register 112, as indicated by the illumination of gate display lamp UBMB. The significance of the operations executed during phase T1 of this order is that the contents of the program address register 105, as incremented by the operation of add-one logic circuit 101 is entered into MB register 112. This information will be used during clock phase T3. No operations are executed during clock phase T2 of the undisplay order. During clock phase T3, the contents of the LA register is gated into AL register 104, as indicated by the illumination of gate display lamps LAAL(1,2). If the binary variable J was specified in the execution description of the statement for this instruction (bit position 7 of the binary format) the contents of the MB register is entered into J register 212 during clock phase T3. The entry of the incremented program store address into the J register serves the purpose of return address saving. Return address saving is a programming option available with the TUN type of instruction and permits transfer to the address designated by the contents of the AL register, while at the same time maintaining in the J register the address of the next sequential instruction in the program store should it be desired for use in executing the remainder of the program. In addition, there is executed during the T3 phase of the undisplay order, instructions to the display control circuitry for FIG. 3, which are instructions selectively to cancel the displays. is given. If all three binary digits are binary "1's," all three nary digits immediately following the symbolic designation TUN. In Table I, the TUN order is written in the symbolic format TUN(XXX). Referring to the binary order format expansion of this symbolic order it is seen that the X's are to be replaced by binary zeros and ones in bit positions 12, 13, and 14 of the instruction. In Table IV, an example of the TUN order is given as TUN110 A2, R1, J. In the note accompanying Table IV, the significance of the six permutations of the underlined digits is given. If all three binary digts are binary "1's," all three displays are removed. It will be recalled that the displays respectively designated N0, N1, N2 are controlled, respectively, by the contents of the X, Y, and Z registers.

The TUD instruction is similar to the TUN instruction except that it controls the plurality of general purpose output display lamps (not shown in FIG. 3) whose functional designaitons may be assigned as desired by the instructor. Similar remarks apply to the display instructions PWDX and UWDX in Table V.

In addition to the foregoing display instructions, there are listed in Table V, display instructions whose symbolic format includes the letter S. These instructions, when executed, cause the processing of the apparatus to stop after executing the functions of the T3 phase of clock 103. It will be noted in the illustrative program statements of Table V that the S instruction is only included for the general purpose displays and none has been included in the network display instructions. The purpose of this was to demonstrate that, in the anticipated operation of the illustrative communication switching network of FIG. 3, all operations take place without a stop. However, the network instructions for FIG. 3 may be modified by including a stop instruction, even though this would not ordinarily be characteristic of the functioning of the communication switching system depicted. By referring to Table I, it will be seen that the display instructions containing the letter S differ from the remaining display instructions in that bits 12 and 7 are "1" and "0," respectively. In the illustrative embodiment, as more particularly diagrammed in FIG. 19, bit 12 serves to transfer the display control from the illustrative network of FIG. 3 to the general purpose display, not shown in FIG. 3. Bit 7 serves the purpose of extending a stop signal path to the clock. It will be appreciated that by regrouping the combination of the circuits controlled by these bits, a stop order can readily be synthesized for use with the communications switching network. This feature might be of advantage where the instructor is delivering a lecture concerning the operation of the communications switching system and desires the system to execute a number of program steps up to a given point and then stop while retaining the display illuminated until he has progressed in his talk to the state indicated by the illuminated diagram. On the other hand, with equally advantageous results, clock 103 may be manually controlled to advance through each of its four clock phases T0 through T3 as many times as required to reach the desired point in the program. With the foregoing general description understood, it will be advantageous now to describe the illustrative call processing program.

The call processing program involves the scanning of each of the input bits capable of being monitored by the system and taking appropriate action whenever the bits indicate the presence of certain information.

The first order in the illustrative call processing program is

(00) WK 0,SC0,C

This order, which is of the general format WX D1, R2, PLC as defined in Table III of the Appendix hereto, is executed as follows: on the T0 phase of clock 103, FIG. 1, gate display lamp ALPAR is illuminated and the contents of AL register 104 is gated into the program address register 105. Program address register 105 controls the program access circuit 106 to select the instruction in program store 100 corresponding to the address registered in register 105. Simultaneously with the entry of the address in access circuit 106, the decimal equivalent of the binary address is displayed in octal number display 106-1. An order word is thereupon read out of program store 100 into order word register 108. Gate display lamp DALA is illuminated, and the data-address (DA) portion of the data word contained in order word register 108 is entered in ALA register 109. Simultaneously, gate display lamp SC0B is illuminated and the contents of scanner register SC0 is gated to unmasked bus 110, displayed on lamps "UB," and registered in MB register 112. Gate display lamps MBLAU and ALALAU are illuminated and the contents of the MB and ALA registers are gated into the logic arithmetic unit 202 which illuminates its ADD lamps and performs the arithmetic addition of the contents of the aforementioned two registers. Gate display lamp LAULA is illuminated and the sum is entered into LA register 201. At the end of clock phase T0, LA register 201 accordingly contains and displays the arithmetic sum of $D1(=0)$ and index register $R2(=SC0)$.

During clock phase T1, gate display lamps LAUB(1, 2) are illuminated and the contents of LA register 201 is gated to unmasked bus 110. Since the binary variable C is specified in the order description, mask and complementing logic circuitry 113 forms the complement of the information on bus 110. Lamps C and UBMB are illuminated and the information is entered into MB register 112. Also during clock phase T1, gate display lamp PARAL is illuminated and the contents of the PAR register, incremented by 1, is entered into AL register 104.

At the conclusion of the T0 phase described above, the contents of the ALA register, after being entered into the LA register, is erased. Accordingly, at the beginning of the T2 phase, the contents of the ALA register is 0. During the T2 phase, the logic arithmetic unit 202 performs the OR function (logical union) with its inputs being the contents of ALA register 109 and MB register 112. Since the contents of the ALA register is 0, the contents of MB register 112 is entered into LA register 201.

During the T3 phase of clock 103, the contents of LA register 201 is gated into K register 204 and the S and H flip-flop display lamps are set according to the sign and homogeneity respectively, of the word in the LA register.

During the T0–T3 phases of the execution of the foregoing order, it is seen that each of the SC0, PAR, ALA, MB, LA, and order word registers displays its information contents. In addition, the gates associated with the transfer of information are selectively controlled to indicate their respective states.

At this time, although there is information in the K register (which is displayed on the register bit display lamps of the K register) none of the network display lamps of FIG. 3 are illuminated.

The result of executing the first instruction is that the status of telephone sets A, B, C, and D of FIG. 3, as determined by scanner register SC0, has been stored in register K. The status of these telephones is represented in complementary form in order that the conditional transfer specified in step (04) below may be accomplished, i.e., transfer is based on the occurrence of a 0 in a specified bit of the K register.

The next instruction in the illustrative call processing program is

(01) TCAZ 00

This order is of the symbolic format TC(T) shown in Table I where T represents a binary variable specified in bit positions 8, 12, 13, and 14 of the binary order format. These four bit positions are used to designate any of the ten conditions under which transfer is to take place depending upon the permutations of the states of the sign and homogeneity flip-flops, more particularly indicated by the letter options in the center column of Table IV. The order TCAZ specifies a transfer whenever the H flip-flop lamp display is illuminated, i.e., whenever the word in LA register 201 is homogeneous. This occurs for the arithmetic zero condition, all "0's" or all "1's" and hence, the abbreviation AZ.

The order TCAZ 00 specifies the data address 00. No index register is specified. Accordingly, during the T0 phase of clock 103 the data address portion of the order read out of order word register 108 is entered into ALA register 109, gated therefrom into logic arithmetic unit 202 and then gated unchanged into LA register 201. During phase T1 of clock 103 the contents of program address register 105 incremented by 1 is entered into AL register 104, and AL register 104, as indicated by the illumination of gate display lamps ALUB(1,2) is gated to unmasked bus 110. The information on the unmasked bus is entered into MB register 112 as indicated by the illumination of gate display lamp UBMB. No action takes place during phase T2 of clock 103. During phase T3, if the states of the S and H flip-flop display lamps indicate the arithmetic zero condition, i.e., all of the bits of the LA register are "0" or "1," the contents of LA register 201 is entered into AL register 104 as indicated by the illumination of gate display lamps LAAL(1,2). This would occur under conditions where none of stations A, B, C, or D has originated a call. Under these circumstances, AL register 104 has the address 00 entered into it so that the next instruction to be entered into PAR register 105 would be instruction 00 above. On the other hand, if the status of the S and H flip-flop display lamps is such as to indicate other than the arithmetic zero condition, no action occurs during clock phase T3.

The next order in the illustrative call processing program is

(02) WZ 100 001

This order which is of the general format WX, is similar to the order in instruction (00). Specifying the binary data word 100 001 determines that this data word shall be entered into index register Z. Referring to FIGS. 2 and 3, it will be seen that bit positions 0 and 5 of the Z register are set at "1" by this order. No action occurs in FIG. 3, however, because no display instruction has been given. The significance of a binary "1" in these positions of the Z register indicates that the corresponding paths of FIG. 3 have been reserved, at least so far as register Z is concerned. These are the trunk link network paths required for AUD-RNG connections should telephone A or B have originated a call which was detected as the result of the execution of program step (00).

The next step in the illustrative call processing program is

(03) WX 100 010

This order is of the same general format as orders (00) and (02). Specifying the data word 100 010 to be entered into the X register 219 reserves line link network and trunk link network paths 1 and 13 for CDPR connection to telephone A. The next instruction in the call processing program is

(04) TKB0 13

This order is of the symbolic format TKB(X) where X is a binary variable (specified in bit positions 12, 13 and 14 of the binary format statement) indicating which of the six bits of the K register shall initiate transfer to a new instruction when that bit is "0." As seen from Table IV, the transfer instruction TKB0 13 dictates transfer to program location 13 if bit 0 of the K register has the binary value "0" stored therein. During clock phases T0, T1 and T2, steps similar to that taken for the above described execution of the TUN type of order are taken by the functional subassemblies of FIGS. 1 and 2. During clock phase T3, if bit position 0 of the K register has the binary value "1" stored therein, no action is taken. However, if bit position 0 of the K register has the binary value "0" stored therein, the contents of LA register 201 is entered into AL register 104 as indicated by the illumination of gate display lamps LAAL(1,2). Since no index register was specified and since no return address saving operation was specified, the location of the transfer instruction is governed strictly by the data word 13. The actual encoding of the punched card will, of course, be in binary form in bit positions 1 to 6 of the binary order format statement of the instructions.

The next instruction in the illustrative call processing program is

(05) WX 010 010

This instruction places the data word 010 010 into the (X) register to reserve in that register line link network and trunk link network paths 3 and 13, respectively, to connect customer dial pulse receiver (CDPR) to telephone set B The next instruction is

(06) TKD1 13

This instruction indicates that transfer to program location 13 shall occur if bit position 1 of the K register is "0." The significance of this step in the illustrative call processing program is to require transfer to instruction 13 if telephone set B has originated the call. As will be recalled from instruction (00), the origination of a call by one of the telephone stations causes a binary "1" to be stored in the corresponding bit position of register SC0. However, since the contents of the SC0 register is stored in the K register in complementary form, the corresponding bit position of the K register will be "0" when the associated station has initialed a call. Accordingly, in instructions (04) and (06), transfer to program location (13) occurs when the respective bit of the K register is detected as being "0."

The next instruction is

(07) WZ 001 100

This instruction causes the data word 001 100 to be entered in Z register 216. The entry of this word in the Z register reserves trunk link network paths 14 and 15 which are required for making connections of the AUD and RNG circuits if telephone stations C or D have originated the call.

The next instruction in the illustrative program is

(10) WX 001 001

This instruction enters the data word 001 001 into the X register to reserve line link network and trunk link network paths 6 and 17 which are required to connect the customer's dial pulse receiver CDPR to telephone station C.

The next instruction is

(11) TKB2 13

This instruction causes transfer to program location (13) if bit 2 of the K register is "0," and signifies that transfer to instruction statement 13 shall occur if telephone station C has originated the call.

The next instruction is

(12) WX 000 101

This instruction inserts the data word 000 101 into the X register and reserves line link network and trunk link network paths 8 and 17 respectively, which are required for connection of customer dial pulse receiver CDPR to telephone station D.

The next instruction is

(13) UWNX 0,X

This instruction is of general symbolic format UWN(R), where R is a binary variable designating one of the four registers X, Y, Z, or K. The particular registers desired (here register X) is encoded in bit positions 13 and 14 of the binary format statement. From the execution description of this instruction given in Table IV, it is seen that the instruction enters the contents of the data word specified at D2 (which in the instant order is 0) OR'd with the contents of the X register into the X register and causes the X register to control the network display of FIG. 3. During phases T1 through T2 of clock 103, operations take place which are similar to those described above in the case of the order PWNX. However, instead of logic arithmetic unit 202 forming the logical product of the contents of the MB and ALA registers, the logic arithmetic unit performs the logical union function. Since the data word specified in the instruction is 0, the contents of ALA register 109 is 0 and the contents of the X register remains unchanged. The network display of FIG. 3 now is illuminated to illustrate the paths which have been seized for use depending upon which of the telephones has initiated the call.

The next instruction in the illustrative call processing program is

(14) WM1 000 001

This instruction is of the symbolic format WM(X), where X is a binary variable indicated in bit positions 7, 8 and 11 of the binary format statement to designate one of the eight word locations in call store 200 into which the data word specified D1 of the execution description is to be entered. Accordingly, the data word 000 001 will be entered into word location (horizontal level) 1 of the call store. This level of the call store is labeled "pulse counter" in FIG. 2 and the entry of the data word initializes the pulse counter. Pulses are counted by rotating the 1-bit to the right one position for every pulse counted. In executing the order WM1, etc., during phase T0, the contents of the ALA and MB registers are entered into the LA register. Since no index register is specified in this type of order the MB register will have received nothing from any of the index registers and accordingly logic arithmetic unit 202 in performing the arithmetic addition of the contents of the ALA and MB registers merely enters the data address portion of the instruction, i.e., the data word 000 001 into LA register 201. During phase T1 of clock 103, the contents of LA register 201 is gated to unmasked bus 110 as indicated by the illumination of gate display lamps LAUB(1,2). Unmasked bus 110 is connected to MB register 112 as indicated by the illumination of gate display lamp UBMB. Accordingly, during the T1 phase MB register 112 contains the data word. During phase T2 of clock 103 the contents of bit positions 7, 8 and 11 of order word register 108 is entered into memory select register 207. As mentioned above, these bit positions designate one of the eight word location positions of call store 200. In the order WM1, the bit positions 7, 8 and 11 of the order word register are entered into the memory select register 207 during clock phase T2. These bits are displayed on the display lamps MS0 through MS2 of register 207. Also during phase T2 of the execution of this order, the contents of MB register 112 is entered unchanged into LA register 201 as indicated by the illumination of gate display lamp LAULA. During phase T3 of clock 103, the contents of LA register 201 is inserted into buffer register 206 and transferred therefrom into call store word location 1 which is designated "pulse counter" in FIG. 2. Simultaneously, the call store access circuit 210 is operated in accordance with the digits registered in memory select register 207. The writing of the data word 000 001 into the "pulse counter" position of call store 200 initializes the pulse counter. Since pulses will be counted by rotating the "1" bit to the right by one position for every pulse dialed, if the digit "1" is dialed, the number 5 bit position of the pulse counter will be illuminated when the condition is detected. If two pulses are counted, the number 4 position will be illuminated, etc.

The next order in the illustrative call processing program is

(15) WM0 000 001

This order inserts the data word 000 001 into word location "0" of call store 200. Word location 0 is designated "timer" in bit positions 5 through 1 and LL in bit position 0. The insertion of this data word accordingly causes bit position 0 of word 0 to be illuminated. This position is designated the last look bit of the call store, hence its designation LL.

The next instruction is

(16) WK 0,SC1

This order is of the same form as instruction (00). It has the effect of inserting the arithmetic sum of the data word indicated at D1 of the format statement and the contents of the SC1 scanner register into the K register. Its significance at this point of the illustrative call processing program is to read the scan point corresponding to the status of customer dial pulse receiver CDPR as recorded in scanner register SC1 and store that status in register K.

The next instruction is

(17) XMK 0

This instruction is of the symbolic format XMK as shown in Table I and its execution description is given in Table III. The function of this instruction is to compute the exclusive OR combination of the last look bit in call mination of gate display lamp LAMS. The word read store memory location 0 and the scan point CDPR whose status was entered into the K register as the result of executing program instruction (16). The status of the CDPR bit in the K register will make the K register bit position 0 equal to "1" whenever there is a dial change. The execution of instruction XMK during phase T0 of clock 103 is similar to that described above for the WK instruction. For example, during phase T1 of clock 103 bit positions 0, 1, and 2 of LA registers 201 are entered into memory select register 207 as indicated by the illumination out of the call store word location indicated by the contents of MS register 207 is entered into unmasked bus 110 as indicated by the illumination of gate display lamps MBR and BRUB. Buffer register 206 will display the contents of the word read out of call store 200. At the same time, the word placed on unmasked bus 110 is placed into MB register 112 as indicated by the illumination of gate display lamp UBMB. During clock phase T2 the contents of K register 204 is entered into ALA register 109 as indicated by the illumination of gate display lamp KQ. The contents of ALA register 109 and of MB register 112 are entered into logic arithmetic unit 202 which illuminates its display lamp EXC indicating that it is computing the exclusive OR combination of the contents of the ALA and MB registers. The result of this computation is entered into LA register 201 as indicated by the illumination of gate display lamp LAULA. During clock phase T3 the contents of LA register 201 replaces the contents of K register 204 as indicated by the illumination of gate display lamps LAMB and BK.

The next instruction in the illustrative call processing program is

(20) TKD0 31

It should be noted that this instruction is given the location (20) inasmuch as locations are written in octal form. This instruction signifies that transfer shall occur to instruction location (31) if the 0 bit of the K register is 0. This bit of the K register will be 0 if no dialing has occurred.

The next instruction in the call processing program is

(21) WM0 0

This instruction inserts the digit 0 in call store memory location 0 to reset the timer since a dialing change was detected. This instruction also resets the last look bit of call store memory word location 0.

The next instruction is

(22) WJ 0,SC1

This instruction is written in the general symbolic format W(R) as indicated in Table I and accomplishes the transferring of the information in scanner register SC1 to J register 212. The status of customer dial pulse receiver CDPR as obtained from scanner SC1 is accordingly entered in the J register.

The next instruction is

(23) PWK 0,J

This instruction computes the logical product of the contents of the K register and the J register and inserts the result into the K register. The significance of this computation is that the status of the CDPR bit in the J register as priorly obtained from scanner register SC1 updates the contents of the K register storing a 1 in the 0 bit thereof if dial change was upward.

The next instruction is

(24) TKB0 16

This instruction specifies a transfer to instruction (16) if the 0 bit of the K register is 0. The significance of this instruction is to require transfer if the dial change was down.

The next instruction is

(25) MK 1

This instruction specifies that the contents of call store memory word location 1 shall be inserted into the K register to increment the pulse counter. The execution description of this instruction is given in Table III. During clock phase T0, the contents of the ALA and MB registers are arithmetically added and entered into the LA register. The ALA register contains the binary representation of the decimal digit 1 writen at A1 in the symbolic format statement of the instruction. During phase T1 of clock 103, bit positions 0, 1, and 2 of the LA register are entered into memory select register 207, and the contents of call store memory word location 1 is applied to unmasked bus 110 and registered in MB register 112 as indicated by the illumination of gate display lamps MBR, BRUB, and UBMB, respectively. During clock phase T2, the contents of MB register 112 is entered into LA register 201 via the logic arithmetic unit 202 which computes the logical OR function between the contents of the MB register and that of the ALA register. Since the latter is 0, the contents of the MB register is entered unchanged into the LA register. During clock phase T3, the contents of LA register 201 is entered into K register 204 as indicated by the illumination of gate display lamps LAMB and BK.

The next instruction is

(26) QC 111 111

This instruction rotates the contents of the K register to the right by one position and then computes the logical product of the rotated contents of the K register and the data word written at D2 and replaces the contents of the K register. The execution description of this instruction is given in Table IV. During clock phase T0 the contents of the ALA and MB registers are arithmetically added and inserted into the LA register. This has the effect of inserting into the LA register the data word (111 111) written at D2. During clock phase T1, the contents of the LA register is applied to the unmasked bus and registered in MB register 112. During clock phase T2 the contents of the K register is rotated one position to the right and the result is inserted into ALA register 109 as evidenced by the illumination of gate display lamp KQ and of rotate logic 111 display lamp QR. In addition, the contents of the ALA register is entered into logic arithmetic unit 202 as indicated by the illumination of gate display lamp ALALAU and the illumination of display lamp AND. The logic arithmetic unit computes the logical product of the contents of the MB register and of the ALA register and enters the result into LA register 201. During clock phase T3 the contents of the LA register is inserted into the K register to update the contents thereof.

The next instruction in the illustrative call sequence is

(27) KM 1

This instruction stores the incremented pulse count obtained from the K register into call store word location 1. The execution description of this instruction is given in Table III and is written in the symbolic form $\underline{X}$M A1. During clock phase T0 the binary equivalent of A1 is entered into the LA register. During clock phase T1 the 0, 1, and 2 bits of the LA register are entered into memory select register 207 and the contents of the K register is applied to unmasked bus 110 as indicated by the illumination of gate display lamp KB. Since no masking or complementing instruction is given in this particular order, mask and complement logic 113 allows the information on the unmasked bus to be entered into MB register 112 unchanged. During clock phase T2 the contents of MB register is entered unchanged into LA register 201 via logic arithmetic unit 202 which computes the logical union of the contents of the MB and LA registers, the latter being 0. During clock phase T3 the contents of LA register is entered into buffer register 206, and memory select register 207 controls call store access 210 to store the contents of B register 206 at the call store word location indicated by the contents of memory select register 207. At this time gate display lamp BM is illuminated.

The next instruction in the call processing program is

(30) T 15

This instruction indicates a transfer to instruction 15. It is an unconditional transfer instruction similar to instruction (04) except that transfer is not conditioned upon any bit of the K register being 0. At this point the recycling of instruction (15) et seq., are accomplished until no further dialing is detected at which time instruction 20 requires the transfer to instruction 31.

The next instruction is

(31) MK 0

This instruction inserts the contents of call store word location 0 into the K register. Its significance is that since no dial change has occurred, the contents of call store word location 0, i.e., the timer and last look spots, shall be entered into the K register to increment the interdigital timer.

The next instruction is

(32) AWK 2

This instruction increments the contents of the K register by 2 so as not to affect the last look bit. The execution description of this instruction is given in Table III and it computes the arithmetic addition of the data word written at D2 and the contents of the K register. During phase T0 of clock 103 the binary equivalent of the decimal digit 2 written at A2 is entered from the order word register into the ALA register and transferred therefrom unchanged by the logic arithmetic unit 202 into LA register 201. During clock phase T1, the contents of the LA register is applied to unmasked bus 110 and transferred therefrom into MB register 112. During clock phase T2, the contents of the K register is entered into ALA register 109. Simultaneously, the logic arithmetic unit 202 computes the arithmetic sum of the contents of the ALA and MB registers and enters the result in LA register 201. During clock phase T3, the contents of the LA register is entered into the K register.

The next instruction is

(33) KM 0

This instruction inserts the incremented time count contained in the K register into call store memory word location 0.

The next instruction is

(34) TKB3 16

This instruction causes transfer to program location (16) if bit 3 of the K register is 0. The significance of this instruction is to require transfer so long as the time count is less than 4 binary 100).

The next instruction is

(35) WK 0,X

This instruction specifies that the contents of the X register is to be entered into the K register.

The next instruction is

(36) UMK 1

The execution description of this instruction is given in Table III. This instruction computes the logical OR function between the contents of the K register and the word in the call store location given by the arithmetic sum of A1 and R1 of the format statement. This computation replaces the contents of the K register. The OR combination of the pulse count taken from the call store and the contents of the K register (which is obtained in instruction 35 from the X register) yields the appropriate line link network path for the connection of the RNG circuit to the called line. It should be recalled that pulse counting is accomplished in the pulse counter by rotating to the right and that trunk link network paths for connections to the AUD and to the RNG circuits were reserved in the Z register. The AUD connection uses the same line link network path as the CDPR connection. The UMK 1 instruction is executed as follows. During phase T0 of clock 103, the arithmetic sum of A1 and R1 designated in the format statement is computed and entered into the LA register (i.e., the contents of the ALA and MB registers are added in logic arithmetic unit 202 and the result entered into LA register 201). During phase T1 of clock 103, the 0, 1, and 2 bits of the LA register are entered into memory select register 207. The word, read out of call store 200 responsive to the operation of call store access circuit 210 by the memory select register, is entered into the unmasked bus, while buffer register 206 displays the contents read out of call store 200. The unmasked bus is connected to MB register 112. During clock phase T2, the contents of K register 204 is entered into ALA register 109. Logic arithmetic unit 202 computes the logical OR function between the contents of MB register 112 and the contents of ALA register 109 and enters the result in LA register 201. During clock phase T3, the contents of LA register 201 is entered into K register 204. Simultaneously therewith, the states of the S and H flip-flop display lamps associated with the LA register are determined.

The next instruction is

(37) PWNX 111 100, K

This instruction computes the logical product of the data word 111 100 and the contents of the K register and inserts the result into the X register which is also enabled to control the network display of FIG. 3. This instruction is similar to the UWNX display instruction of step 13 except that the logical product is computed instead of the logical union. Accordingly, on phase T0 of clock 103 the contents of the K register is gated to unmasked bus 110 as indicated by the illumination of gate display lamp KB and the unmasked bus is connected to MB register 112 as indicated by the illumination of gate display lamp UBMB. The logic arithmetic unit computes the logical product of the contents of the MB register and of the ALA register, the latter containing the data word 111 100. The remaining operations executed on phases T1, T2, and T3 are similar to those described above. The execution of the PWNX order at this time sets up the line link network paths to the called line on FIG. 3 and takes down the trunk link network paths to the CDPR.

The next instruction is

(40) UWNX 0,Z

This instruction computes the logical OR function between the data word 0 and the contents of the Z register and places the result into the Z register. The contents of the Z register controls the network of FIG. 3. The execution of this instruction at this time illuminates whichever trunk link network paths were reserved in the Z register for connection to the AUD and RNG circuits; see steps (02) and (07) above.

The next instruction is

(41) WK 0,SC1

This instruction places the contents of scanner register SC1 into the K register and its execution at this time causes the states of the scan points of the SC1 register associated with the RNG and AUD circuits to be stored in the K register.

The next instruction is

(42) TKB1 52

This instruction causes transfer to program instruction location (52) if bit 1 of the K register is "0," and its execution at this time causes transfer to occur if the called line, which is connected to the RNG circuit, has not yet answered the call.

The next instruction is

(43) TUN111 44

This instruction causes a transfer to program instruction location (44) and extinguishes the displays on FIG. 3 which are controlled by the contents of the X, Y, and Z registers of FIG. 2. The contents of the X, Y, and Z registers remain unchanged. This instruction is of the symbolic format TUN(XXX) as shown in Table I. The letters X are binary variables to be assigned values in positions 12, 13, and 14 of the binary order format. The execution description of this instruction is given in Table IV. When the bits specified at bit position 14, 13, and 12 have the binary value "1," they cause the X, Y, and Z registers to lose control of their associated paths on the network display shown in FIG. 3. During phase T0 of clock 103, the contents of the ALA and MB registers are arithmetically added by the logic arithmetic unit and the result placed in LA register 201. The contents of the ALA register is the binary equivalent of the octal number 44. During phase T1, the contents of AL register 104 is entered onto the unmasked bus 110 as indicated by the illumination of gate display lamps ALUB(1,2). The unmasked bus is connected to MB register 112 as indicated by the illumination of gate display lamp UBMB. The MB register, accordingly at this time, contains the incremented address which was inserted in the AL register from the address placed in the PAR register during clock phase T0. No action occurs during clock phase T2 and during clock phase T3, the contents of LA register 201 is inserted into AL register 104 as indicated by the illumination of gate display lamps LAAL(1,2). Also during phase T3, the presence of binary "1's" in bit positions 14, 13, and 12 of the order divorce the network of FIG. 3 from control of the X, Y, and Z registers, respectively.

The next instruction is

(44) UWNY 0,X

This instruction inserts the contents of the X register into the Y register and causes the Y register to control the network. The network then displays the line link network paths to the junctor circuit.

The next instruction is

(45) WL 110 000

This instruction inserts the data word 110 000 into the L register. The execution of this instruction at this time sets the mask for the instruction given at program location (46).

The next instruction is

(46) WK 0,SC1,PL

This instruction computes the logical product of the contents of the SC1 register and the contents of the L register, which contains the data word 110 000, and inserts the results of the computation into the K register. This instruction is similar to instruction (01) except that the product masking instruction is included, as indicated by the PL in the format statement. Product masking is accomplished on phase T1 of clock 103 incident to the transferral of information from unmasked bus 110 into MB register 112. The specification of the product masking option causes mask and complement logic circuit 113 to illuminate its product masking display lamp PL. In executing the product masking option, the logical product bit-by-bit of the contents of the index register specified at R2 of the format statement, in this case register SC1, is computed with the contents bit-by-bit of the L register. The execution of this instruction at this time masks out all scan points of register SC1 except those corresponding to the status of circuits J1 and J2 of FIG. 3. The result is stored in register K. It should be noted that scan points for circuits AUD and RNG are still connected to the calling and called lines, respectively.

The next instruction is

(47) CWK 110 000

This instruction compares the state of scan points J1 and J2 with that of data word "11," the condition that exists as long as both lines are off-hook. The execution description of this instruction is given in Table III. As indicated therein, the data word is subtracted from the contents of the K register and the result determines the states of the S and H flip-flop displays associated with the LA register. During phase T0 of the execution of this order, the arithmetic sum of the contents of the ALA and MB registers is entered into the LA register. During phase T1, the contents of the LA register is applied to the unmasked bus 110. Mask and complement logic circuit 113 is instructed to complement the information on the unmasked bus as indicated by the illumination of its complementing lamp C. The complemented information is entered into MB register 112. During phase T2 of clock 103, the contents of the MB and ALA registers are arithmetically added in logic arithmetic unit 202 and the result entered into LA register 201. Since the contents of the MB register contains the complemented contents of the unmasked bus, the result is an arithmetic subtraction. During clock phase T3, the contents of LA register 201 sets the states of the S and H flip-flop display lamps associated with the LA register.

The next instruction is

(50) TCAZ 46

This instruction causes transfer to program location (46) if the result of the comparison made as a result of executing program statement (47) was arithmetic zero, in which case the H flip-flop display lamp is illuminated. The execution of this instruction at this time causes transfer to occur as long as both lines are off-hook.

The next instruction in the illustrative call processing program is

(51) TUN111 00

This instruction causes a transfer to instruction location (00) and divorces the displays of FIG. 3 from control of the X, Y, and Z registers.

The next instruction is

(52) TKB2 51

This instruction causes transfer to instruction (51) if bit 2 of the K register is "0." Its execution at this time causes transfer to occur if the calling line connected to circuit AUD abandons the call.

The last instruction in the illustrative call processing program is

(53) T 41

This instruction causes transfer to instruction (41) and causes the supervisory scanning of circuits AUD and RNG to resume.

*Detailed description of FIGS. 6 through 25*

Figure 6:
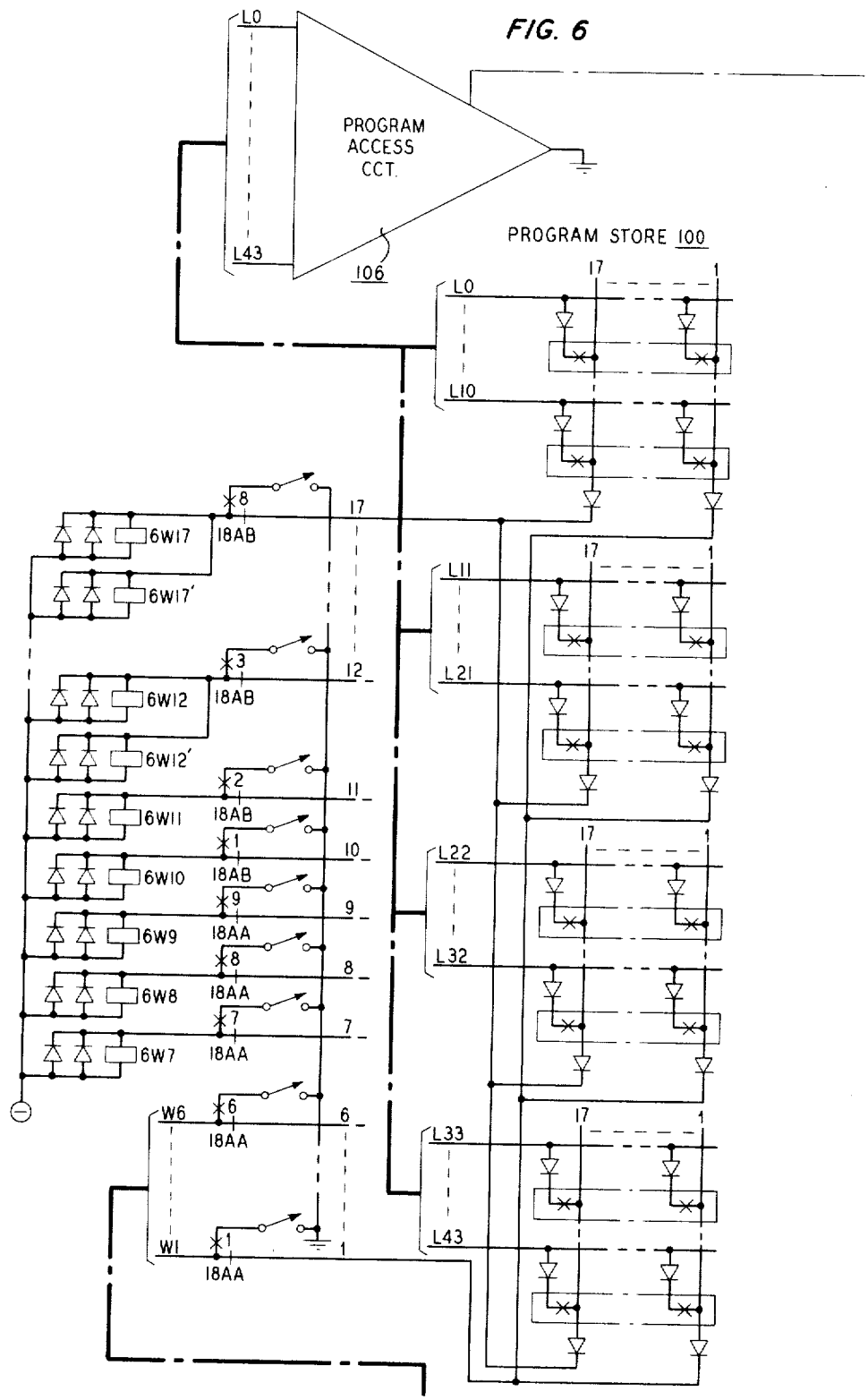
FIG. 6 shows the program store, program memory access and order word register.
Figure 7:
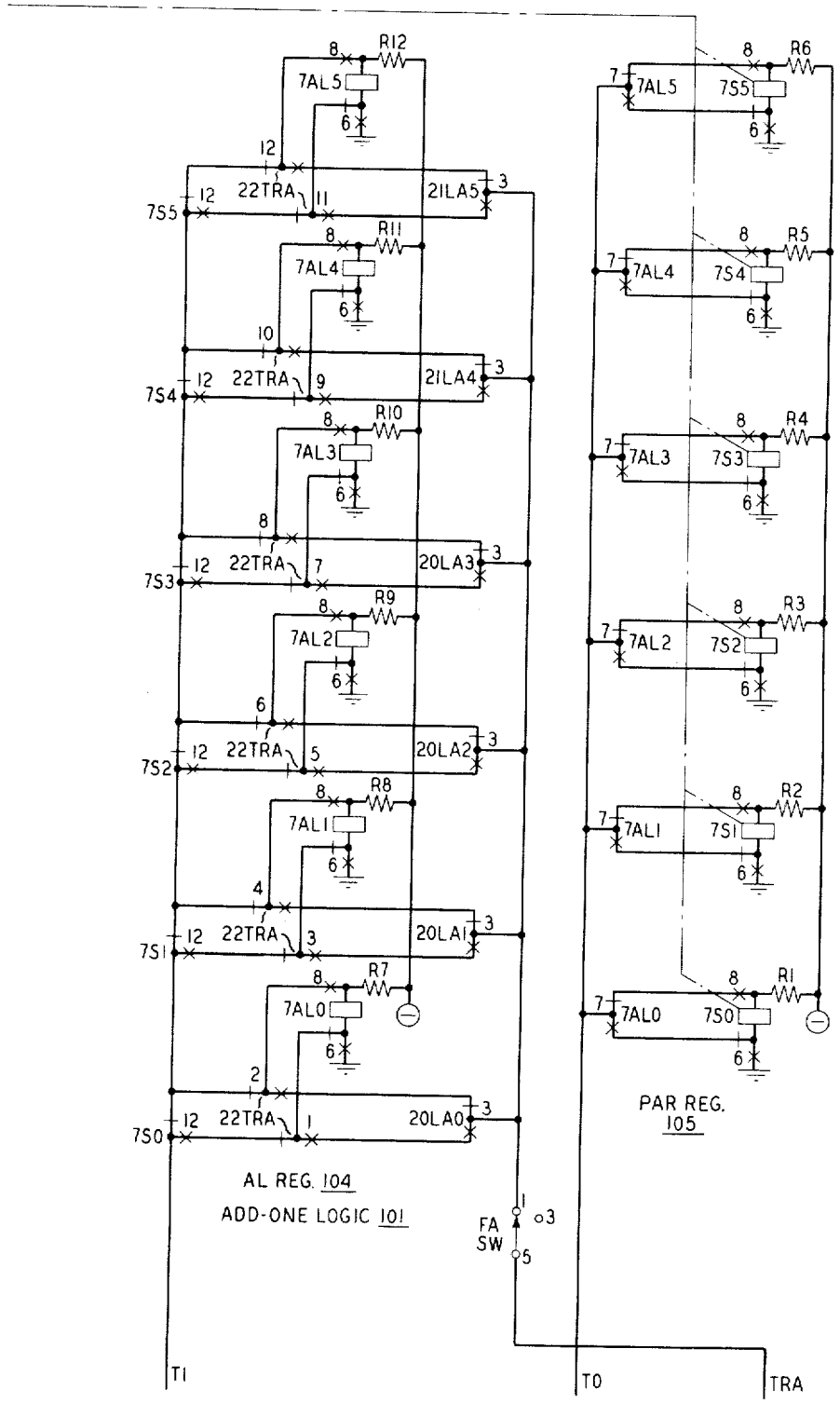
FIG. 7 shows the program address register.

The detailed circuitry of FIGS. 6 through 25 will now be briefly described. FIGS. 6 and 7 show the program memory access circuit 106, the program store 100, order word register 108, AL register 104, and PAR register 105. Registering relays for bits 5 and 6 of the order word register are shown in FIG. 10. Of the leads L0 through L43, shown in FIG. 6, only one at a time is connected to ground, the selection being made by the relay contact tree of program memory access circuit 106 which shows a ground at the right-hand apex of the triangular symbol. This ground is extended by work contacts (not shown) of relays 7S0 through 7S5 as indicated by the dashed line connecting the windings of these relays to the triangular symbol of the access circuit in FIG. 6. The ground that is applied to the row selected by the relay tree can appear only on the vertical for which holes have not been punched in the corresponding row of the program card. Each row of a program card is represented by a corresponding rectangular symbol in FIG. 6. The ground that is applied to the row selected by the relay tree only appears on the verticals for which holes have not been punched in the corresponding row of the program card. Accordingly, the absence of a hole causes the associated contact to be made and the presence of a hole causes the associated contact to be opened. The diode in series with the contact eliminates sneak paths that might otherwise exist. Accordingly, the pattern of holes and no holes on a program card results in a pattern of no ground and ground conditions on the seventeen verticals, verticals 7 through 17 being connected to the windings of relays 6W7 through 6W17 in FIG. 6. Verticals 1 through 4 are connected via contacts of relay 11DALA to the windings of relays 10ALA0 through 10ALA3. Verticals 5 and 6 are respectively connected to the windings of relays 10W5 and 10W6. The latter two relays in turn, via their No. 1 contacts, extend grounds over make contacts 1 and 2, respectively, of relay 11DALA to the windings of relay 10ALA5 and 10ALA4, respectively. Relay 11DALA is operated during clock phase T0 of every order. Bits W5 and W6 operate relays 10W5 and 10W6, respectively, because these bits are used by the decoder circuit of FIG. 12 to make certain distinctions among classes of memory orders and to specify the use or non-use of the insertion option on registry to memory orders. The availability of these bits for decoding follows from the fact that on memory orders only bits in positions 1, 2, and 3 of the binary format are ultimately interpreted as the address in the call store, since only three binary bits are required to designate any of the eight word locations in call store 200.

Also shown in FIG. 7 is the program address register 105 and add-one logic circuit 101. During phase T0 of any order, a ground is applied to lead T0 in FIG. 7 by the clock and mode control circuitry of FIG. 18. The ground appearing on lead T0 is applied over contacts of the AL register selectively to operate relays 7S0 through 7S5 of PAR register 105. This causes the contents of AL register 104 to replace the contents of PAR register 105. During phase T1 of clock 103, relay 22TRA is released. If relay 7S0 is released, relay 7AL0 is operated by the ground on lead T1. If relay 7S0 is operated, relay 7AL0 is shunted down and the ground on lead T1 proceeds to relay 7AL1, which is controlled in a manner similar to that described for relay 7AL0. The ground on lead T1 propagates as the binary carry for the add-one operation from lower to higher bit positions until it finds a position in which the 7S— relay is released. The 7AL— relay for this last position is operated, whereas all the 7A1 relays for lower bit positions are shunted down. Thus, the program address register 105 is incremented by 1 and the contents replaced into the AL register during phase T1 of any order. Lead TRA in FIG. 7 is grounded during phase T3 of clock 103 for any order specifying a transfer. Relay 22TRA is operated under the same circumstances. Thus, when a transfer is to occur, the contents of LA register 201 (FIGS. 20 and 21) replaces the contents of AL register 104. During the following phase T0, it is this new address that is gated from relays 7AL into relays 7S of PAR register 105. The FA switch in FIG. 7 is a maintenance switch which can open the continuity of lead TRA to prevent the apparatus from carrying out transfer orders and which also prevents the apparatus from stopping despite the fact that orders carrying the stop instruction are being executed. The latter is accomplished in FIG. 18 by opening the continuity of lead STP, thereby opening the operating path for relay 18E.

Figure 8:
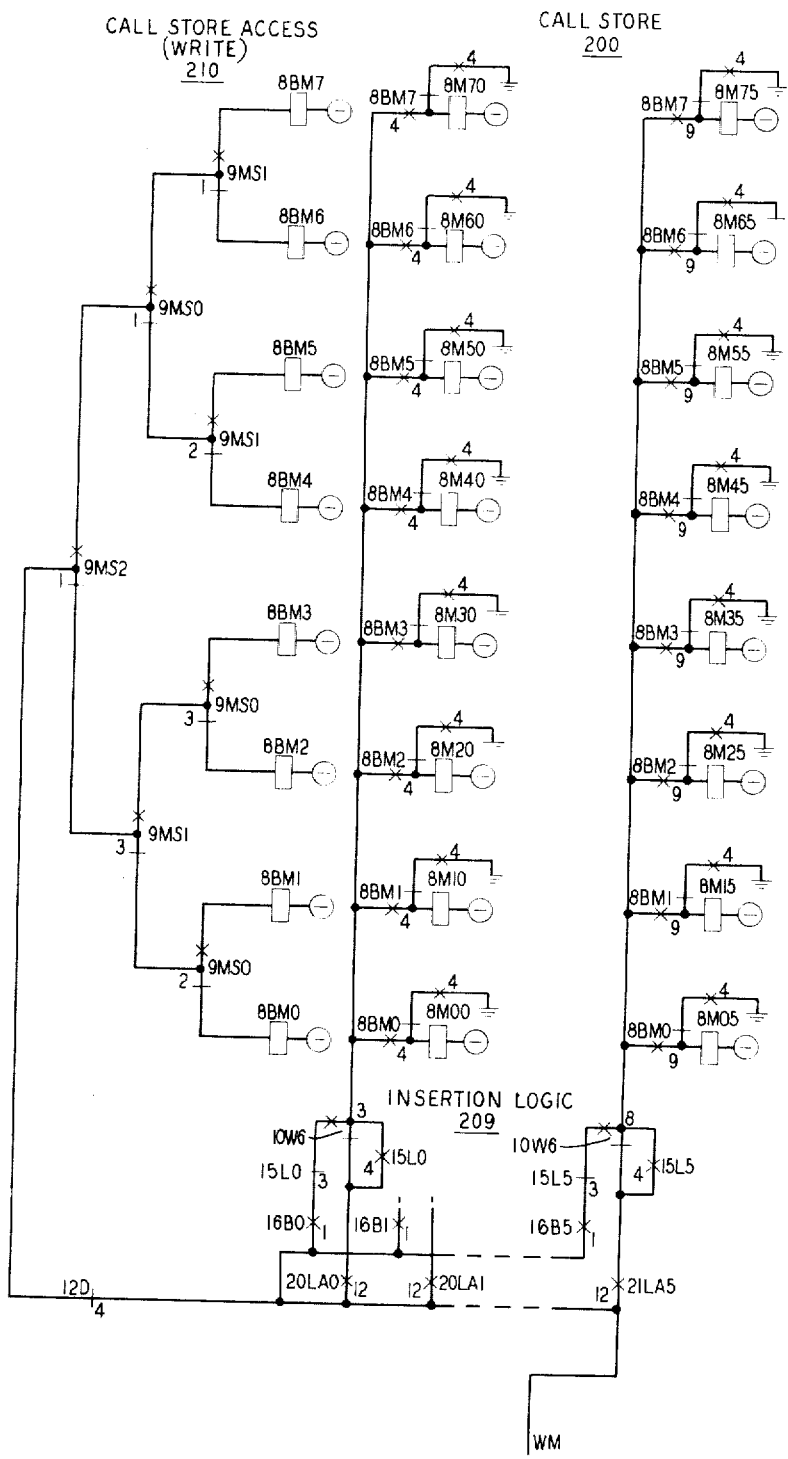
FIGS. 8 and 9 show the temporary memory (call store) registers together with the write-in access and insertion logic circuits.
Figure 9:
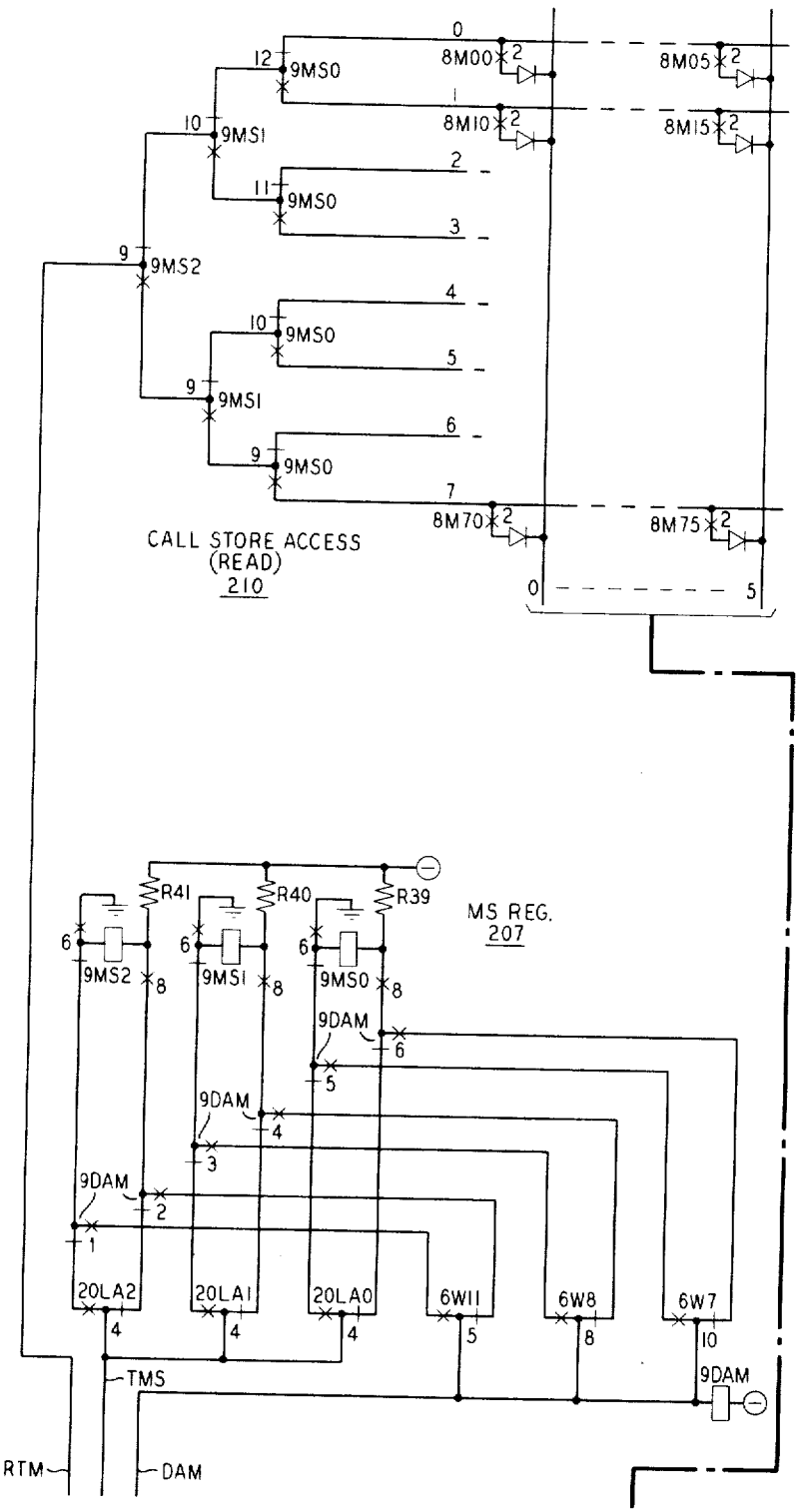
Figure 10:
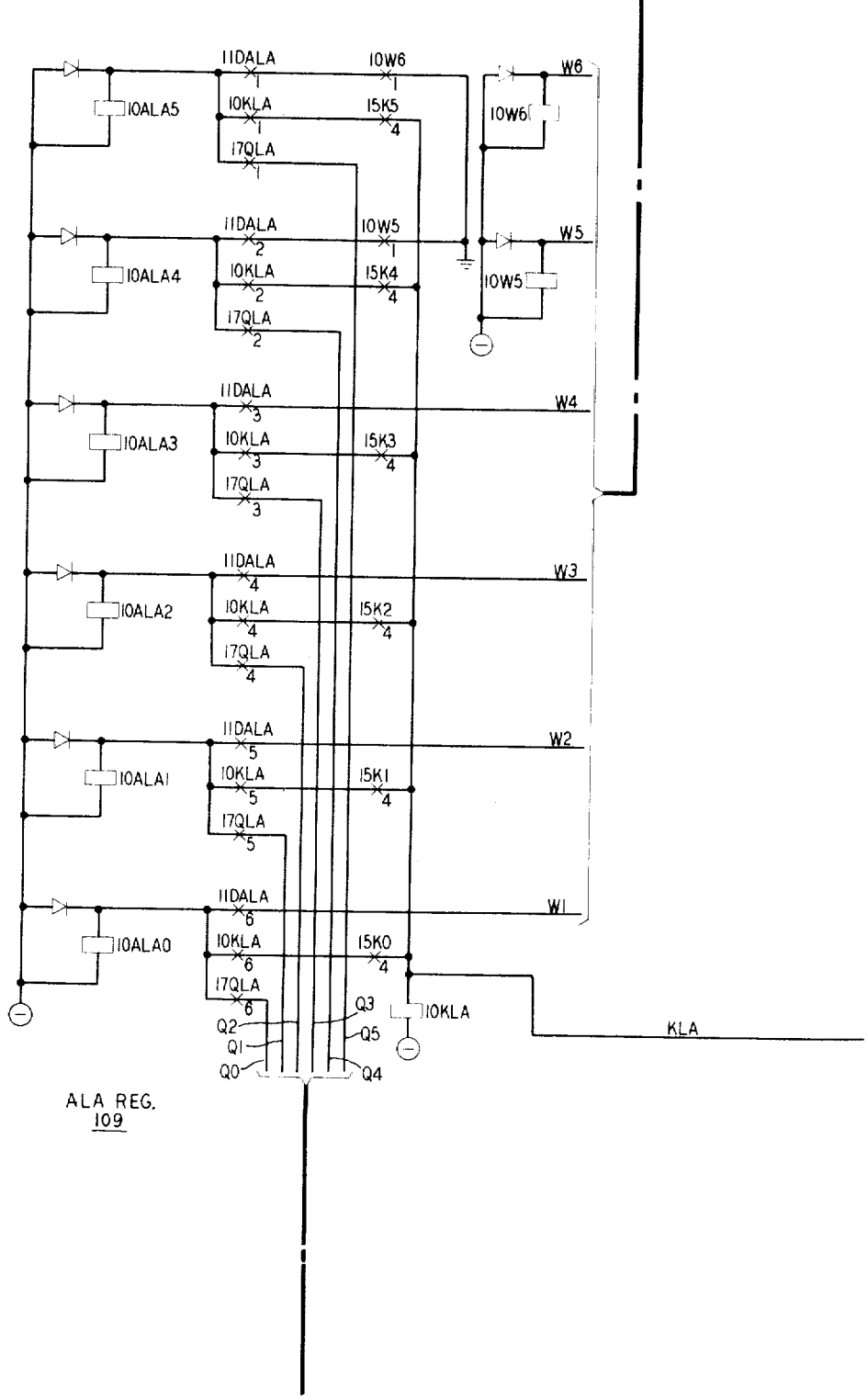
FIG. 10 shows the ALA register.

FIGS. 8 and 9 show the call store 200, the call store access circuit 210, MS register 207, B register 206, and insertion logic circuit 209. It will be recalled that for any memory order, except a word to memory order (WM), the call store address is specified by the sum of the contents of the data address portion of the order and the contents of the index registers specified by the order. This addition is performed during phase T0 of clock 103 by the logic arithmetic unit (shown in FIGS. 20 and 21). The sum is stored in LA register 201 (also shown in FIGS. 20 and 21). During phase T1 of any memory order except a word to memory order, the grounding of lead TMS in FIG. 9 results in gating the call store address from the LA register into the memory select MS register 207. Relays 9MS0 through relays 9MS2 receive the address from the LA register. On word to memory orders, the call store address is specified by bits 7, 8, and 11 of the order in binary format. During phase T2 of these orders, relay 9DAM is operated and, at its contacts in series with relays 9MS0 through 9MS2, moves the call store address from relays 6W7, 6W8, and 6W11 of order word register 108 to the windings of the respective ones of relays 9MS0 through 9MS2.

The contacts of relays 9MS0 through 9MS2, shown in FIG. 8, steer the ground made available on lead WM during phase T3 of any memory order that involves a write operation to one of relays 8BM0 through 8BM7. The selected 8BM— relay then places the corresponding set of six call store memory relays 8M— under control of insertion logic circuit 209. For example, if relay 8BM2 is operated by the contents of MS register 207, responsive to the ground on lead WM, call store memory relays 8M20 through 8M25 are rendered available to insertion logic circuit 209. Bit 6 of the binary format of a register to memory order is the bit used to specify insertion masking. If bit 6 is "0," i.e., no insertion masking required, the contents of the LA register, as represented by the contacts 20LA0 through 20LA5 in FIG. 8, operates the respective ones of the 8M relays of the call store; for example, relays 8M20 through 8M25 mentioned above. On the other hand, if bit 6 is equal to "1," the operation of the aforementioned call store memory relay depends upon the contents of the L and B registers, respectively. If a particular bit of the L register is "0," the corresponding bit of the B register determines the operation of the respective 8M— relay of the call store. If a particular bit of the L register is equal to "1," the corresponding bit of the LA register operates the associated one of the 8M— call store memory relays. In FIG. 8, a back contact of relay 12D is inserted between the WM lead and the steering contacts of memory select register 207. Relay 12D is a slow operate relay which is energized during phase T3 of all orders. The break contact of relay 12D removes the selected call store location from the control of insertion logic 209 before the termination of clock phase T3. As far as B register 206 (FIG. 16) is concerned, when the insertion option is specified in an order, relay 16MBB is operated. Accordingly, only at a bit position for which the associated relay of the L register is operated does the corresponding B register relay come under control of the associated LA register relay.

Referring to FIG. 9, it is seen that for each state of the MS register 207 a unique path is established from lead RTM to one of the horizontal levels of the relay tree shown in the upper part of the figure. During phase T1 of any memory order that involves a read operation, lead RTM is grounded by the decoder circuit of FIG. 11. This ground places unmasked bus relays 13UB0 through 13UB5 in FIG. 13 under control of the selected row of six call store memory relay contacts, shown in FIG. 9. The information contents of the call store memory transferred to relays 13UB0 through 13UB5 is entered into B register 206 via work contacts of relays 13UB0 through 13UB5 in FIG. 16 which transfer the ground from lead B to the respective one of relay windings 16B0 through 16B5. Additional contacts of relays 13UB0 through 13UB5 are employed in the mask and complement logic circuits of FIG. 16 controlling the operate paths for the MB register relay windings shown therein.

Figure 17:
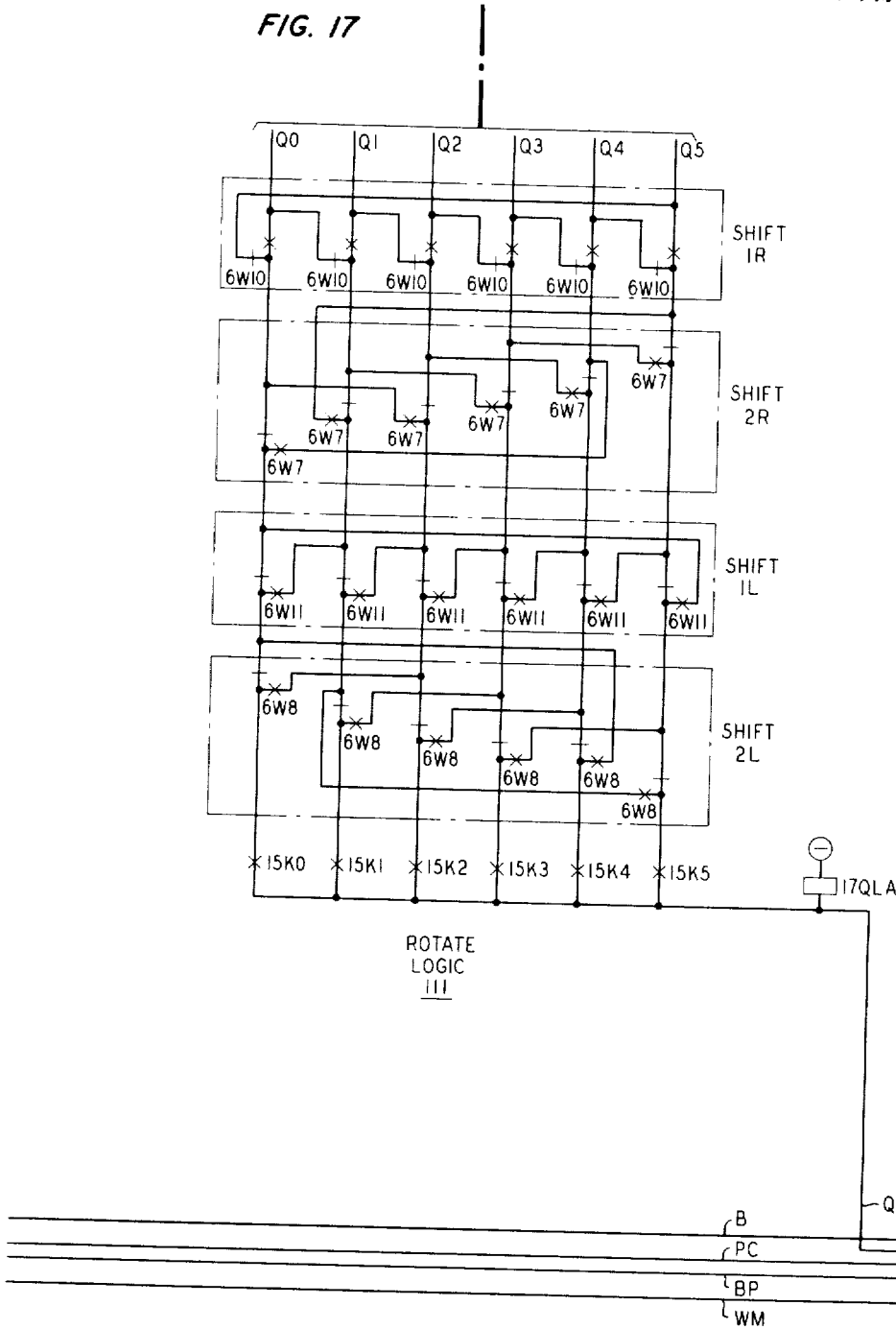
FIG. 17 shows the rotate logic.

FIG. 10 shows the circuitry for gating information into ALA register 109. During phase T0 of any order, relay 11DALA is operated. Contacts of this relay, shown in FIG. 10, connect bits 1 through 6 of the binary format of the order, i.e., the data address portion of the order, to the corresponding windings of relays 10ALA0 through 10ALA5. Lead KLA and relay 10KLA are activated during phase T2 of ADD, COMPARE, and LOGICAL orders as denominated in Table III. Relay 10KLA operated enables the contents of K register 204 to replace the contents of ALA register 109 during phase T2. Relay 17QLA, in FIG. 17, is energized during phase T2 of shift and rotate orders, gating the rotated contents of K register 204 into ALA register 109 via its 17QLA contacts shown in FIG. 10.

Figure 11:
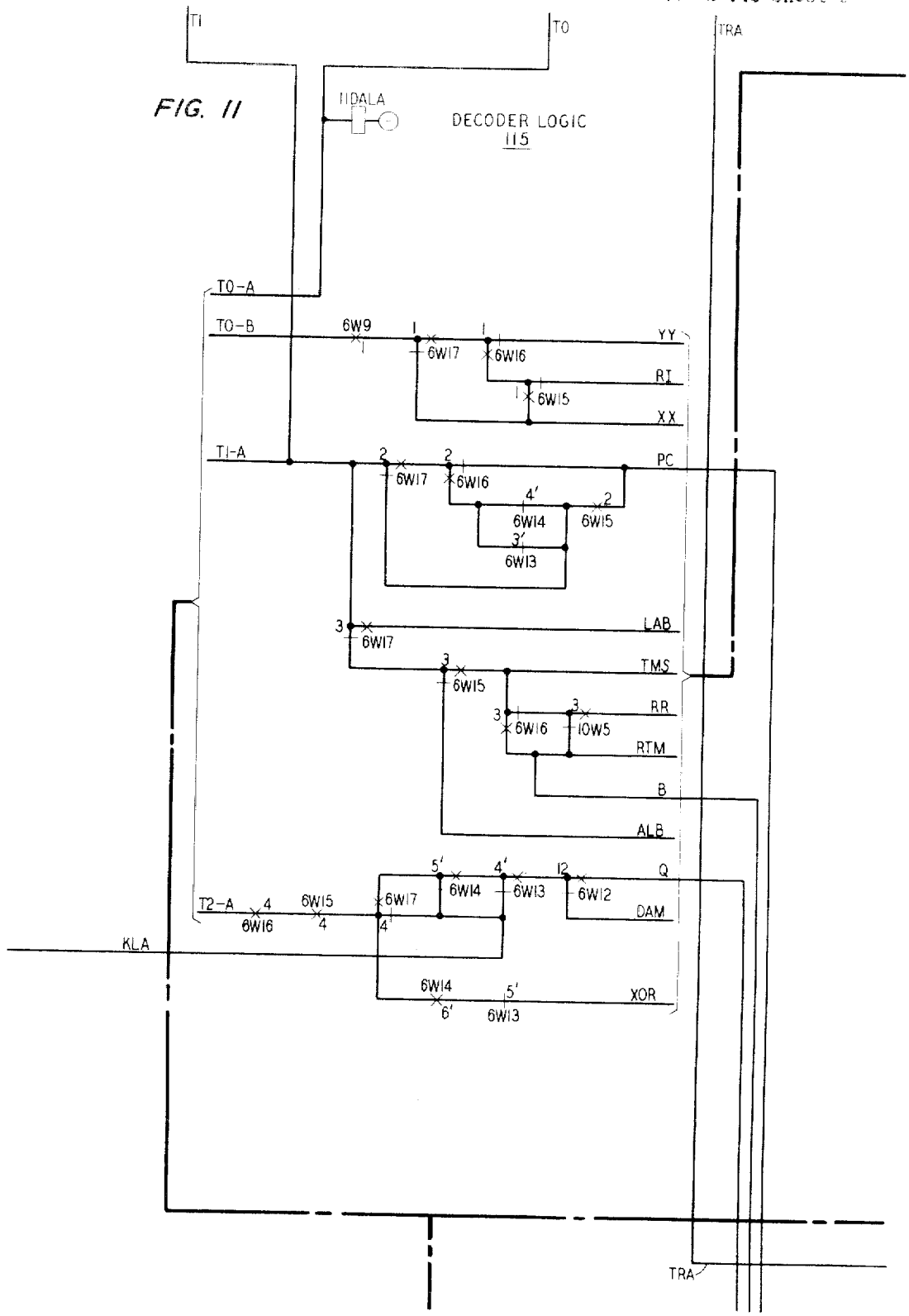
FIGS. 11 and 12 show the decoder logic and time clock buses.
Figure 12:
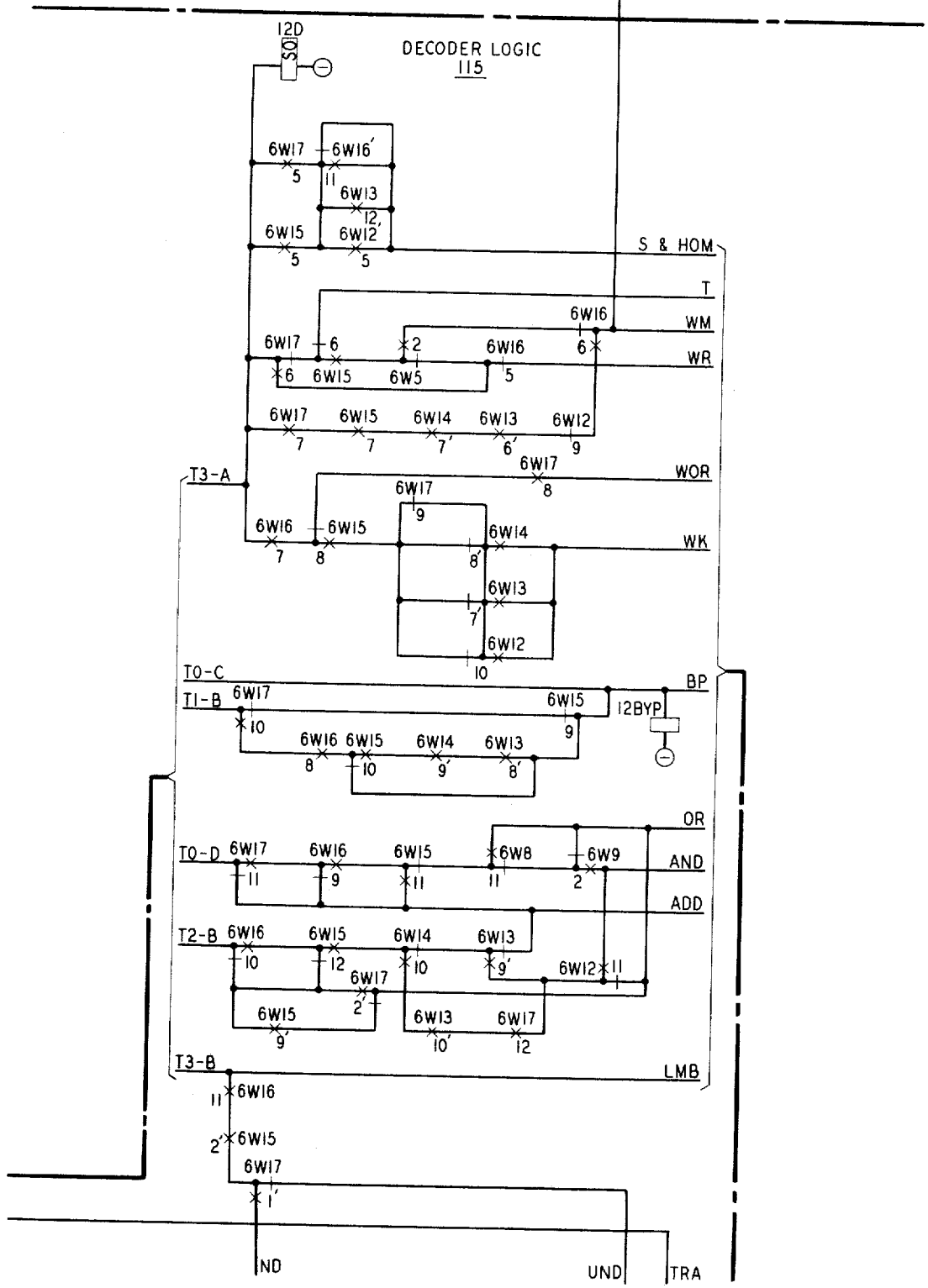

FIGS. 11 and 12 show the decoder logic. Grounds are provided by the clock and mode control circuitry of FIG. 18 to leads T0, T1, T2, and T3 in that order. Contacts of the order word register relays 6W— control the transmission of the clock provided grounds to the other circuits of the apparatus in accordance with the coding of the binary order statements written in the program store memory cards of FIG. 6.

Figure 13:
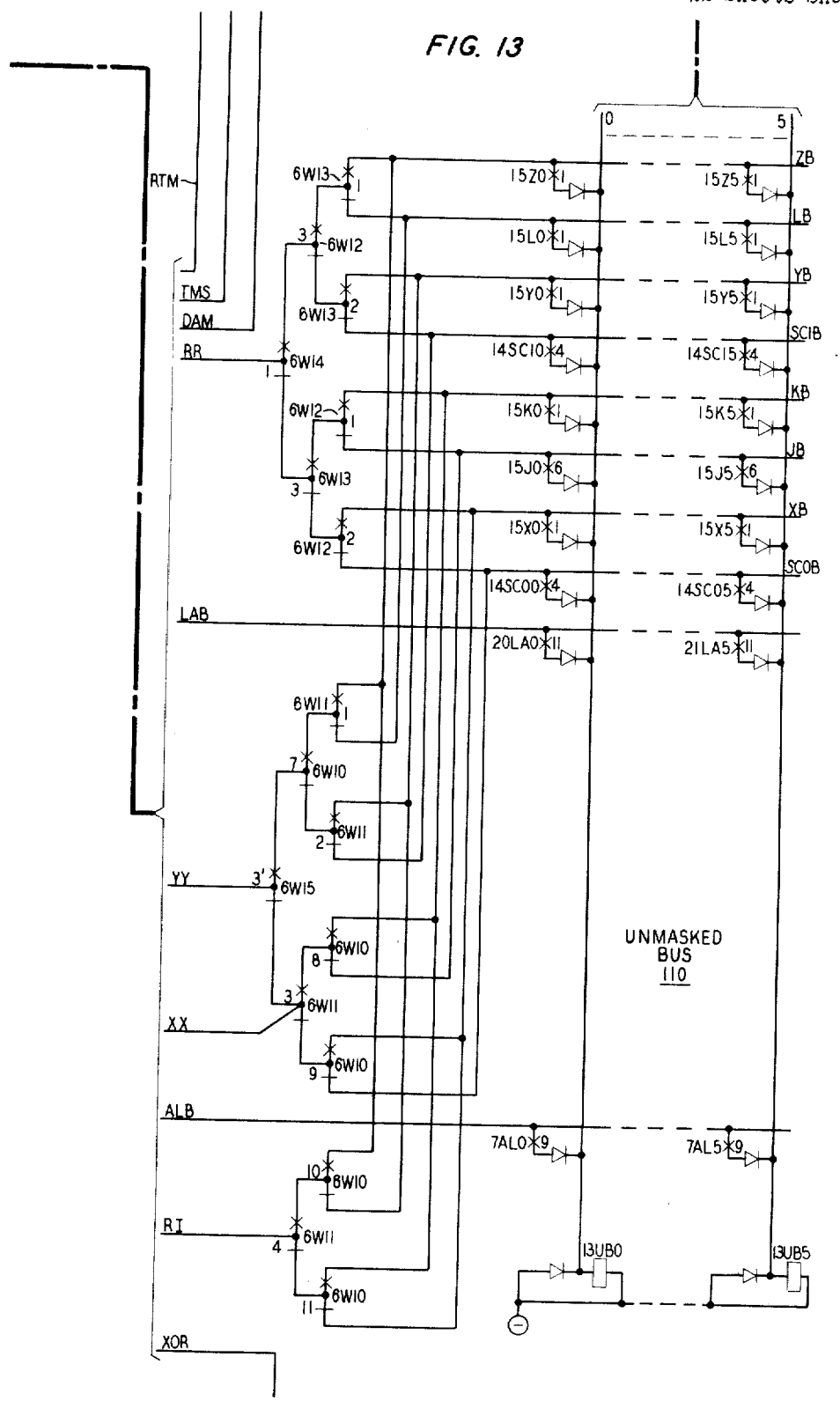
FIG. 13 shows the gating between the storage contacts of the register relays and the unmasked bus.

FIG. 13 shows the circuitry for transferring information from any of registers X, Y, Z, J, K, L, SC0, or SC1 to unmasked bus 110. During phase T0 of clock 103, a ground is made available to one of leads XX, YY, or RI of FIG. 13 by the decoder logic circuitry of FIG. 11. Lead XX is associated with registers SC0, X, J, and K; lead YY is associated with registers SC0, SC1, X, Y, Z, J, K, and L; and lead RI is associated with registers X, Y, Z, and K. Considering lead YY, for example, the selection of one register from the aforementioned set with which this lead is associated is made by contacts of order word register relays 6W15, 6W10, and 6W11. The contacts of the selected one of the registers associated with the YY lead then control the operation of the corresponding one of relays 13UB0 through 13UB5. Similar considerations apply to leads XX and RI. Lead RR is activated by the decoder logic of FIG. 11 during phase T1 of register to memory orders. When so activated, it selects one of registers X, Y, Z, J, K, L, SC1, or SC0 to be connected to unmasked bus 110. In register to memory orders, one of the registers may be used during phase T0 of clock 103 to designate the location in memory to which the contents of one of the other registers is to be moved. Accordingly, leads XX, YY, or RI are grounded during phase T0, while lead RR is grounded during phase T1 to utilize the contents of these respective sets of registers.

Figure 16:
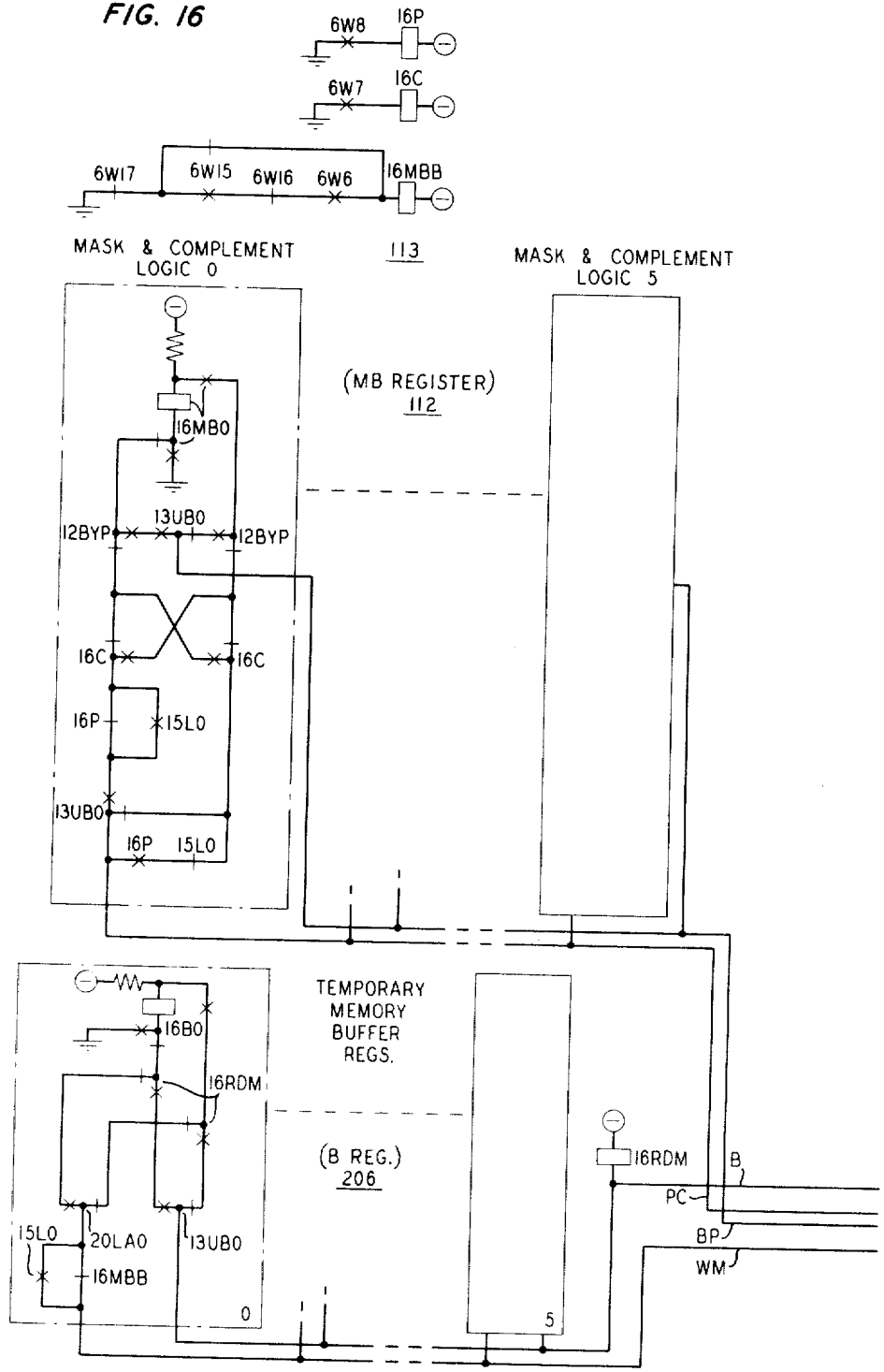
FIG. 16 shows the mask and complement logic.

To effect the return address saving option, which is available on transfer orders, access must be gained to AL register 104. Lead ALB is therefore activated during clock phase T1 of all transfer orders thereby connecting the contents of the AL register via its contacts 7AL0 through 7AL5 in FIG. 13 to the verticals of unmasked bus 110. Lead LAB is used for gating the contents of LA register 201 to unmasked bus 110 during phase T1 of certain orders. This is accomplished via contacts 20LA0 through 20LA5, shown in FIG. 13. The contents of LA register 201 are connected to unmasked bus 110 during the execution of shift and rotate orders. During such orders, the data address portion of the format statement is stored in LA register 201 during phase T0 of clock 103. During phase T1, the contents of the LA register is connected to unmasked bus 110. At the same time, unmasked bus 110 is connected to operate relays 16MB0 through 16MB5 of MB register 112, shown in FIG. 16. Thus, on shift and rotate orders the data address portion of the format statement is transferred from the LA register into the MB register so that logic arithmetic unit 202 may form the logical product of the data address portion of the instruction with the rotated contents of K register 204, the latter being stored in ALA register 109 (FIG. 10). The masking operation with an appropriate data address portion of the order can convert a rotate order into a shift order. The contents of the LA register may be applied to unmasked bus 110 also for the purpose of executing product masking and/or complementing instructions as specified by the format statement. The mask and complement logic circuitry is shown in FIG. 16. Lead BP and relay 12BYP are respectively grounded and operated to connect the unmasked bus to the MB register without modification and thus provide for bypassing the mask and complement logic. Lead PC is grounded by the decoder logic of FIG. 11 during phase T1 of any order for which the product masking of complementing options are available. Relays 16P and 16C are energized whenever order word register 108 is occupied by an order in which the product masking and complementing options, respectively, are used.

Figure 14:
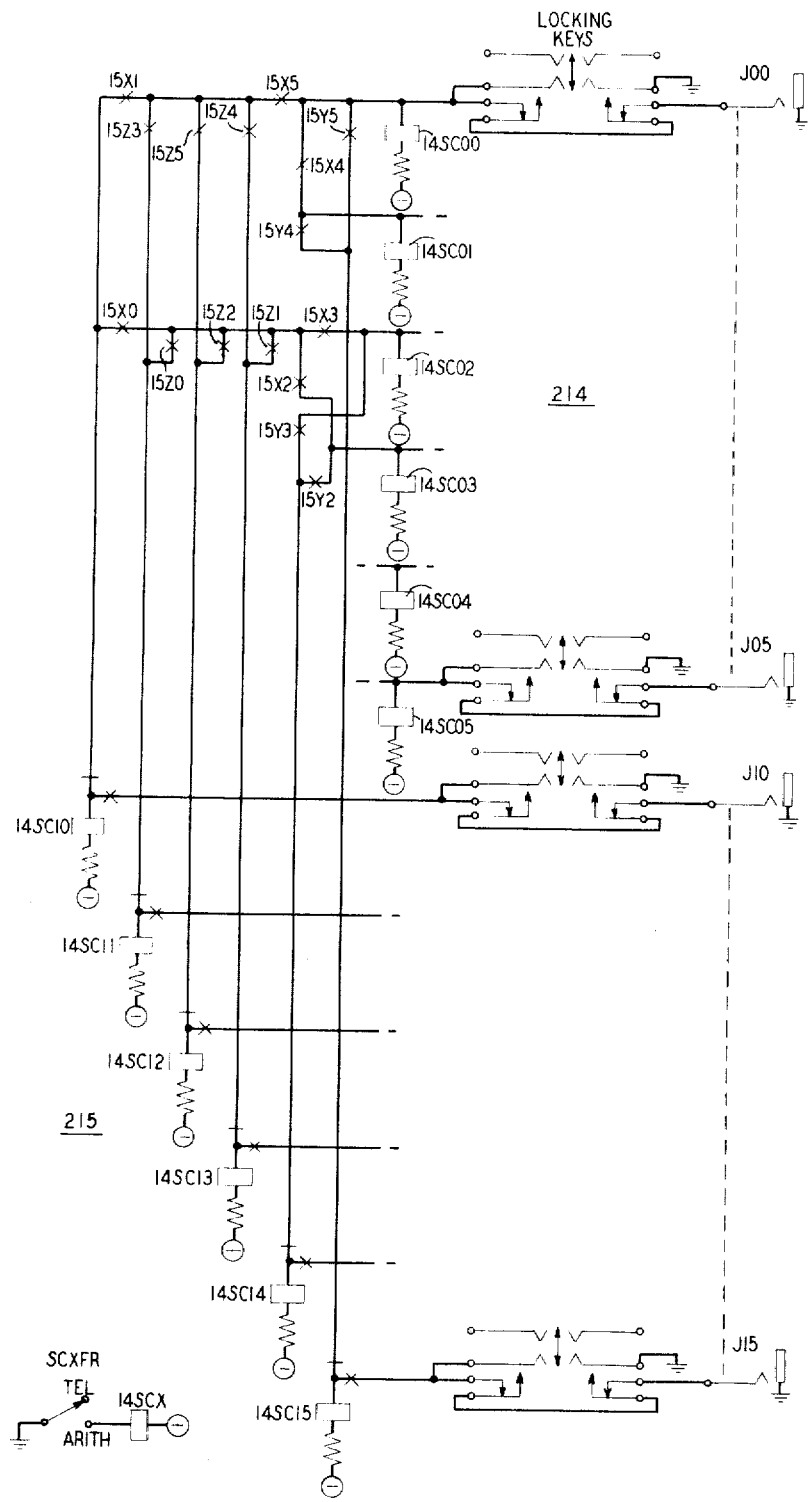
FIG. 14 shows the scanner logic and scanner register relays.

FIG. 14 shows the scanner circuitry. Relays 14SC00 through 14SC05 constitute the SC0 register. Relays 14SC10 through 14SC15 constitute the SC1 register. Each of the aforegoing relays is controlled by a respective three position locking key. One position of the associated key provides a ground to operate the corresponding SC0 register relay. Another position of the locking key provides an open circuit to the respective SC0 relay. The third position connects the SC0 relay to an external jack for remote operation. A similar set of keys and jacks is provided for the SC1 register. In addition, register SC1 may be placed under the control of the inputs to the SC0 register through a network of contacts of registers X, Y, and Z. This control choice is made by contacts of relay 14SCX which, in turn, is controlled by selector switch SCXFR. This selector switch has two positions. In the TEL position, back contacts of relay 14SCX connect the windings of relay 14SC10 through 14SC15 to the network of contacts controlled by registers X, Y, and Z. In position ARITH of the selector switch, the contacts of relay 14SCX isolate the windings of the SC1 register relays from the aforementioned network of X, Y, and Z register contacts.

Figure 15:
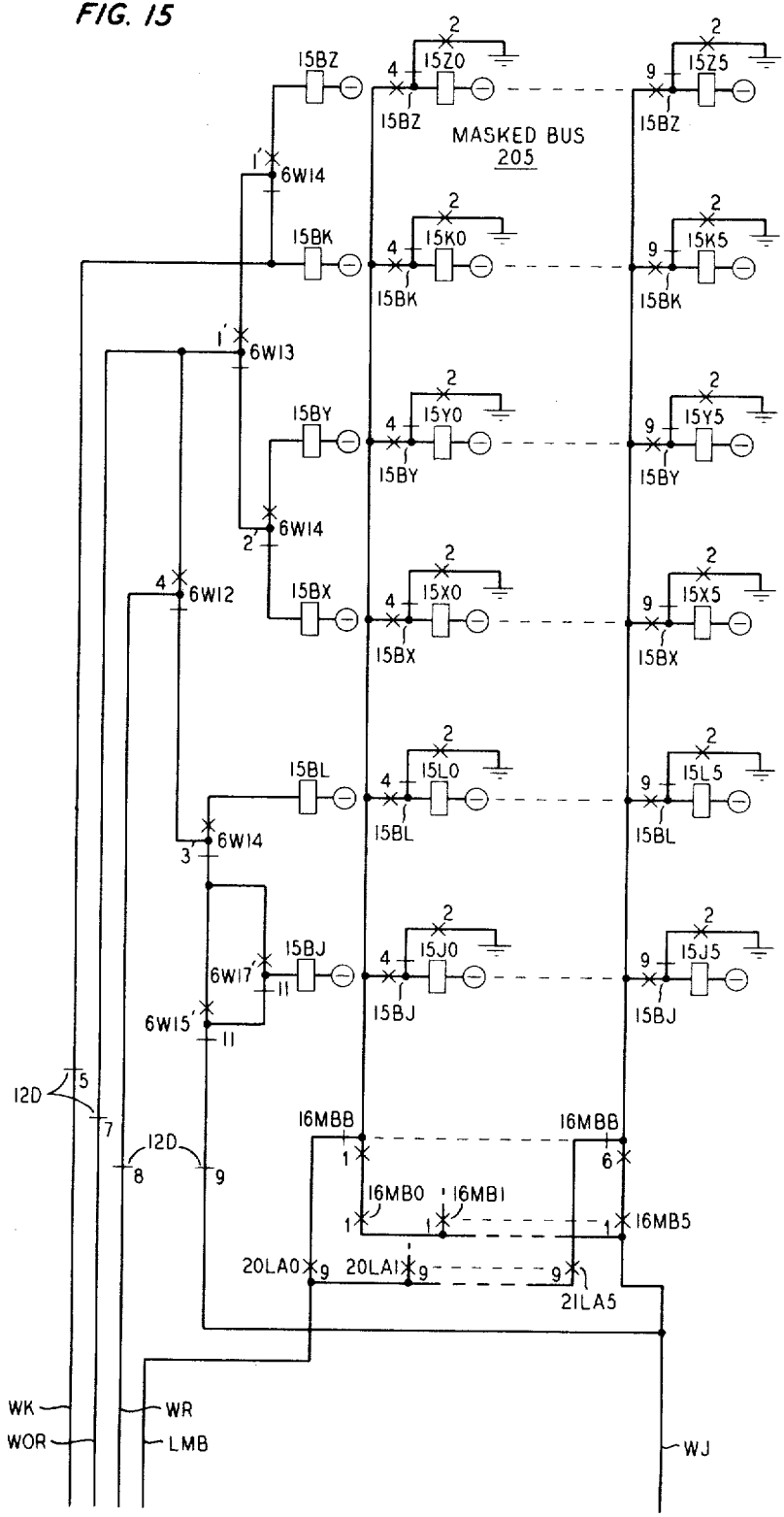
FIG. 15 shows the general purpose registers and input from the masked bus.

FIG. 15 shows the circuitry for writing into registers J, K, L, X, Y, and Z. The source of the data to be written into one of these registers is LA register 201. Lead LMB is grounded by the decoder circuitry of FIG. 12 during phase T3 of any order. If relay 15MBB is operated (as it is during transfer orders when the MB register may be connected to unmasked bus 110) the gating of the LA register contents to masked bus 205 is inhibited. Even if this gating is not inhibited, LA register 201 may not have its contents transferred to one of registers X, Y, Z, J, K, or L unless one of gating relays 15BJ, 15BK, 15BL, 15BX 15BY, or 15BZ is operated. Lead WR is grounded during the execution of word to register or memory to register orders. The particular one of the registers is selected by contacts 6W13, 6W14, 6W12, 6W11, 6W15, or 6W17 of order word register 108. Lead WOR is grounded during non-transfer network orders to insert data into one of registers K, X, Y, or Z. The remaining classes of orders for which data is written into a register are shift and rotate orders and those orders during which arithmetic or logical operations are performed. In each of these orders, the destination register is K register 204 and the grounding of lead WK operates relay BK during phase T3 of such orders. Relays 15BJ through 15BZ do not remain operated during the entire T3 clock phase because of the break contacts of slow operate relay 12D which interrupt the continuity of the T3 grounds present on leads WK, WOR, and WR. This procedure, as was true of the operations for writing into call store 200 in FIG. 8, assures that a register is exposed to the information on the bus only while the correct data is on the bus. Specifically, when the clock phase advances from T3 to T0, the contents of the LA register is altered. If any relay of the LA register changed before the previously selected bus to register relay had released, an incorrect bit might have been written into the register. Accordingly, the bus to register gates are closed shortly before the termination of the T3 clock phase.

FIG. 17 shows the rotate logic. Of the four bits of a shift or rotate order stored in order word register relays 6W7, 6W8, 6W10, and 6W11 of order word register 108, only one may have the binary value "1" in any order. Relay 6W11 is operated for a rotation to the left by one bit position. Relay 6W8 is operated for a rotation to the left by two bit positions. Relay 6W7 is operated for a rotation to the right by two bit positions.

Figure 18:
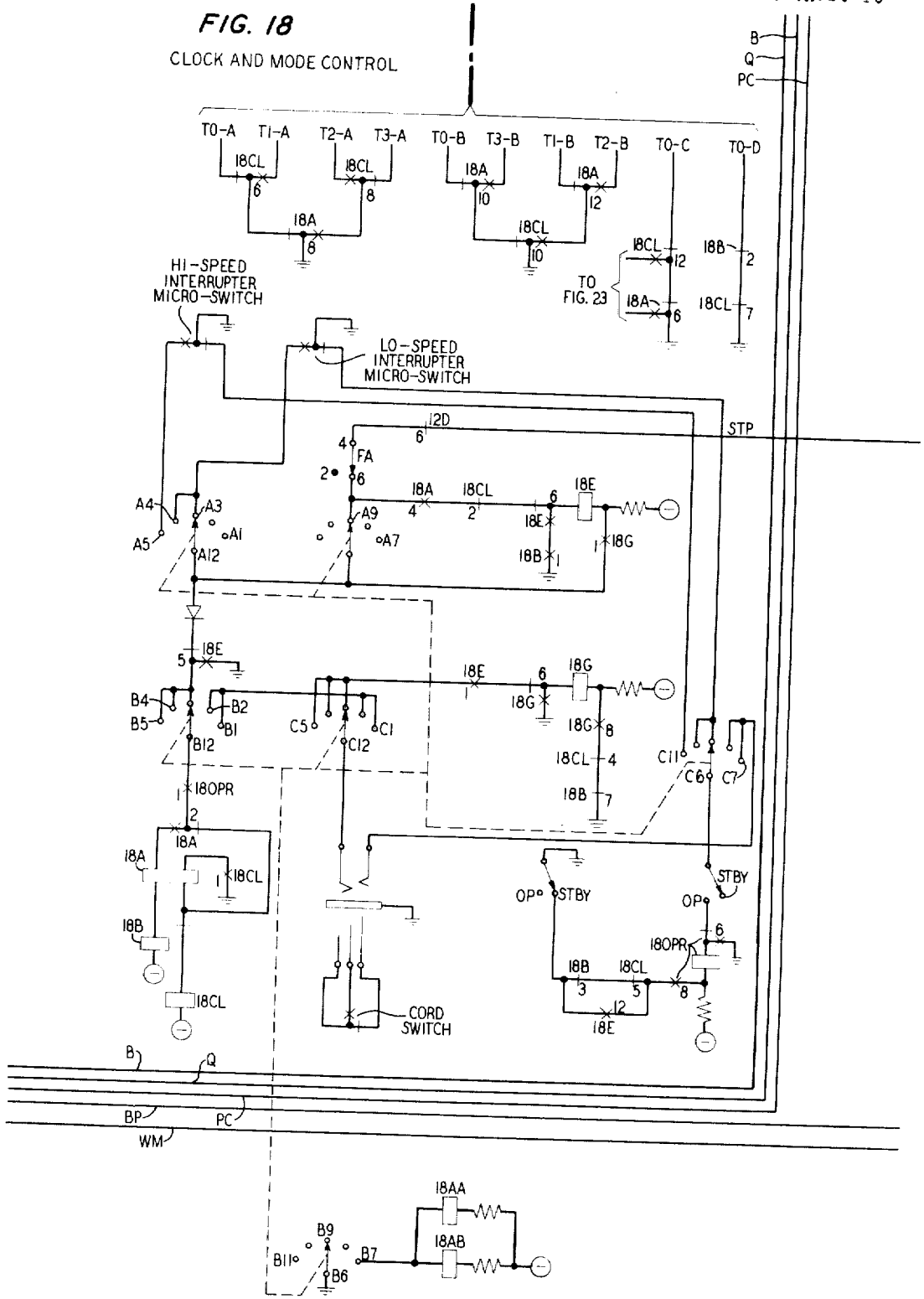
FIG. 18 shows the clock and mode selection control circuitry.

FIG. 18 shows the clock and mode selection control circuitry. The selection of clock speed and the mode in which the apparatus is to operate is made by means of the five-position switches A12, A6, C12, and B12 in FIG. 18. Relays 18AA and 18AB are energized only when the mode control switch is in its extreme clockwise position. This position is the manual word, manual clock by stepping position. The contacts of relays 18AA and 18AB, shown in FIG. 6, switch the control of order word register 108 from the program store 100 to the seventeen toggle switches shown in FIG. 6 to provide for the manual setting of an order.

The control clock comprises relays 18A, 18B, and 18CL and has four stable states. The transition from one state to the next is caused by a change of the single clock input from ground to open or vice versa. During operation in one of the automatic clock, automatic word modes (the extreme two counterclockwise positions of the five position switch) the clock input is interrupted periodically by one of the two microsecond switches operated by a motor driven cam (not shown), one for high speed and the other for low speed.

A stop order energizes relay 18E during clock phase T3 (when relay 18A is operated and 18CL is released). Relay 18E then supplies a permanent ground to the clock input. After relay 18G has been energized by depressing the cord switch button, relay 18E is shunted down on the following micro-switch closure through a contact of relay 18G. This returns the control of the clock input to either of the micro-switches. The clock input remains grounded throughout the transition so that the next change of state of the clock after a stop (the transition from T3 to T0) occurs at the beginning of the first complete open state of the micro-switch. This insures that T0 will be of normal time duration. In the automatic word, manual clock by instruction mode of operation (the centermost position of the five position switch) relay 18E is operated during clock phase T3 of every order through the low speed micro-switch and the five position switch. This stops the clock at phase T3. Operation is resumed in exactly the same manner as described above for a stop order. During operation in a manual clock by stepping mode (the two most clockwise positions of the five position switch) the relays 18E and 18G have no control on the clock. In this case, it is intended that the instructor or student generate the interruptions by operation of the cord switch.

The standby operate switch STBY is used to insure smooth transitions during mode switching and to provide for a smooth startup. The operator releases relay 18OPR by placing the standby operate switch STBY in the standby, i.e., its extreme rightmost, position. During the next occurrence of a T0 clock phase, or immediately if relay 18E is operated, relay 18OPR is shunted down. Relay 18E is operated if either the mode of operation is automatic word, manual clock by instruction (the centermost position of the five position switch), or the mode of operation is automatic word, manual clock (high or low speed) and the machine is stopped at phase T3 of a stop order. When relay 18OPR releases, it places a permanent open circuit at the clock input. If the clock was stopped at phase T3, this indicates a transition from phase T3 to T0. After the mode of operation has been changed by the operator, the standby operate switch STBY is returned to the operate position. Relay 18OPR can be operated only when an open circuit exists at the clock input regardless of the mode of operation. This insures the phase T1 will be of normal duration.

Figure 19:
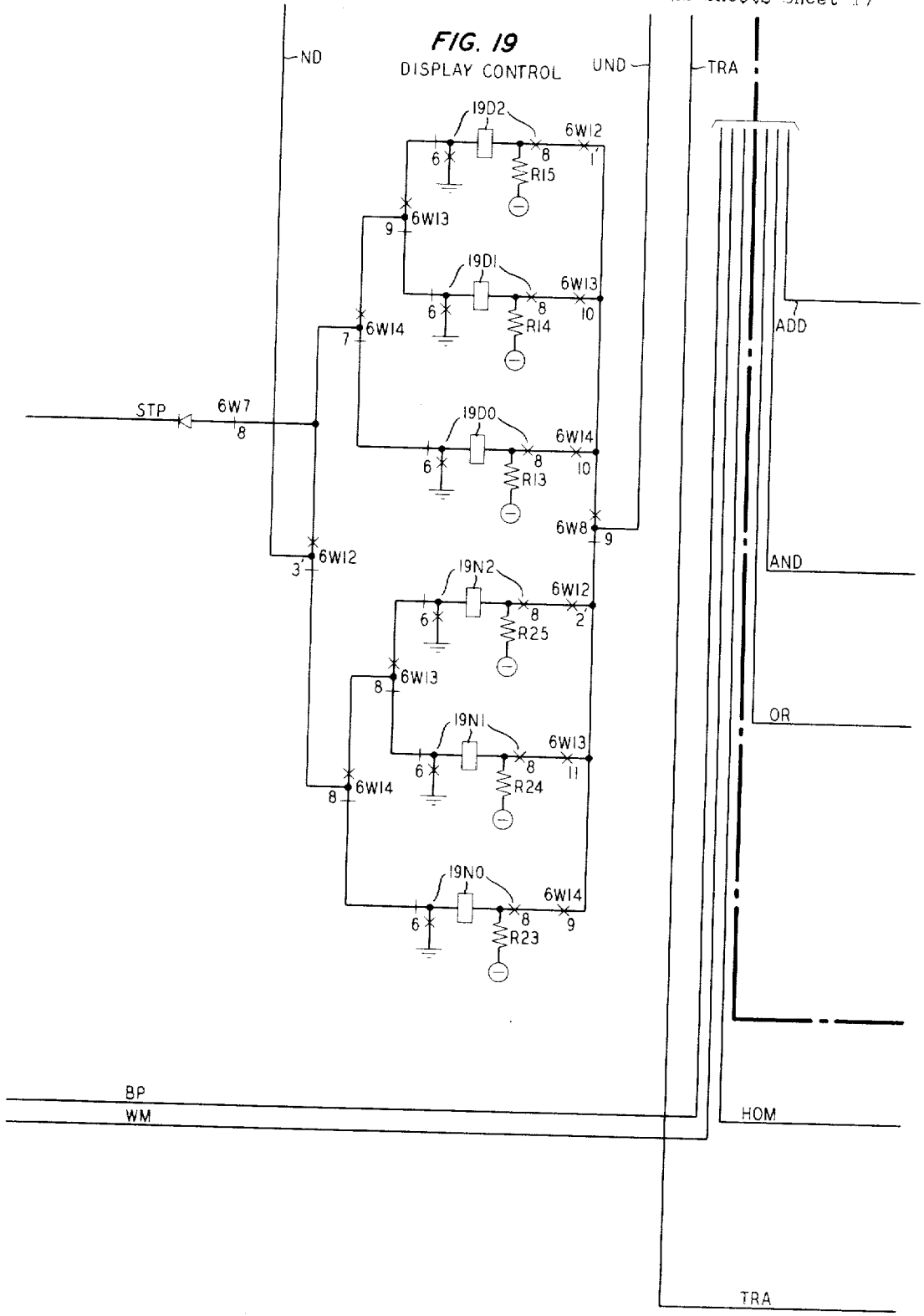
FIG. 19 shows the display control circuitry.

FIG. 19 shows the network and output display control relay circuitry. The operation of network control relays 19N0 through 19N2 is controlled by bit positions 12, 13, and 14 of the format statement. When relay N0 is operated, it permits the contents of the X register to control the display lamps of FIG. 3, as shown in somewhat more detail in FIG. 25. Similarly, the contacts of relays 19N1 and 19N2 permit the contents of the Y and Z registers to control the network display of FIG. 3. Although not shown in detail, work contacts of relays 19D0 through 19D2 control displays in similar fashion to the lamps shown in FIG. 25. Lead ND in FIG. 19 is grounded during clock phase T3 of any non-transfer network or display order. Bit 12 of the order word register differentiates between network and display orders. Bits 13 and 14 effect the one-out-of-three choice among the X, Y, and Z registers. The result is the operation of one of the six relays 19N0 through 19N2 or 19D0 through 19D2. Each of these relays has a latching path so that it will remain operated until shunted down by a succeeding TUN or TUD order. During the execution of display and stop orders, since bit 7 of the binary format statement is "0," ground is transmitted to the operating path of relay 18E, stopping the clock from advancing to phase T0. Lead UND is grounded during phase T3 of TUN and TUD orders. Here bit 8 differentiates between network and display orders. Any combination of the three 19D— or 19N— relays may be shunted down on one TUN or TUD order.

Figure 20:
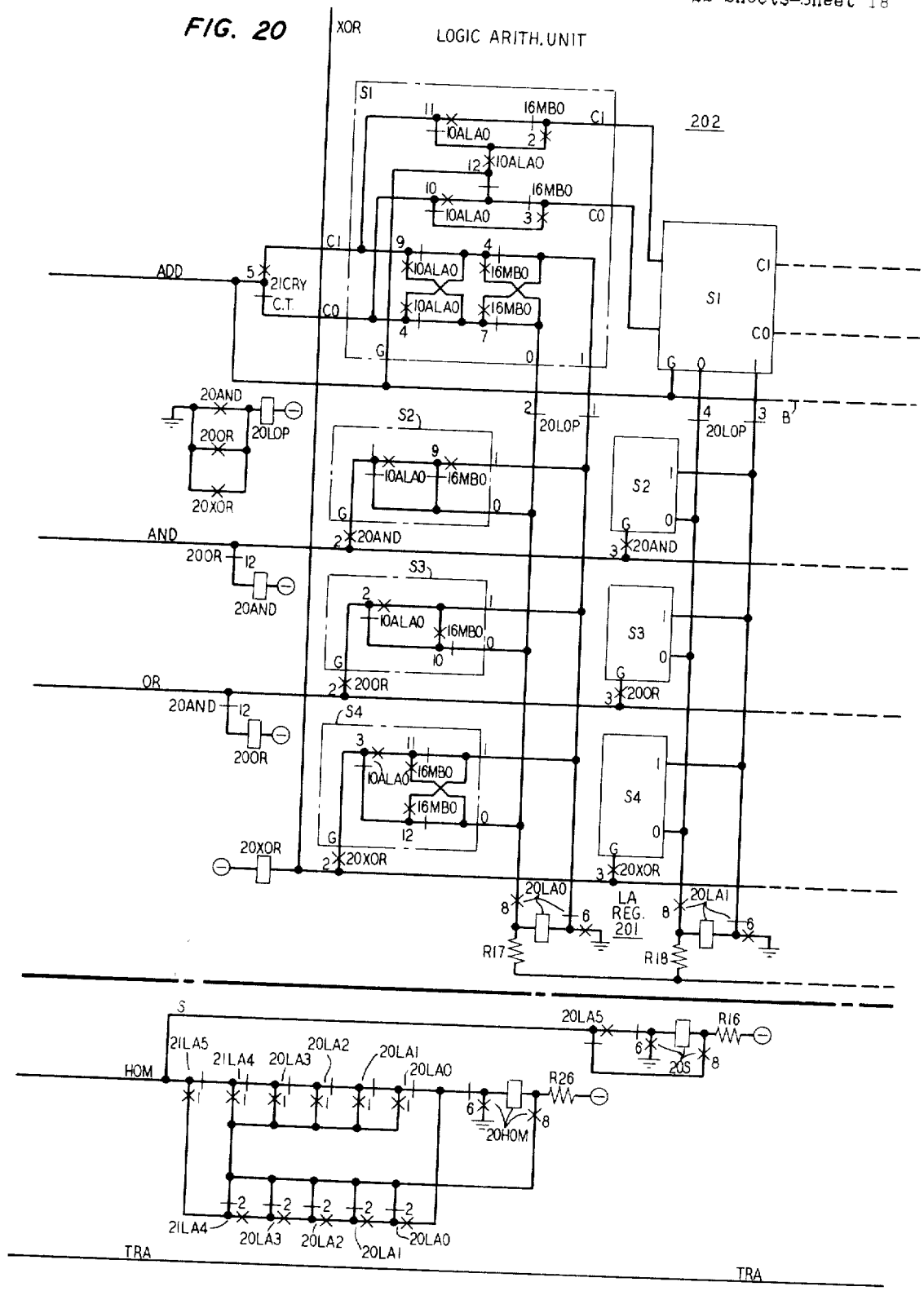
FIGS. 20 and 21 show the logic arithmetic unit.
Figure 21:
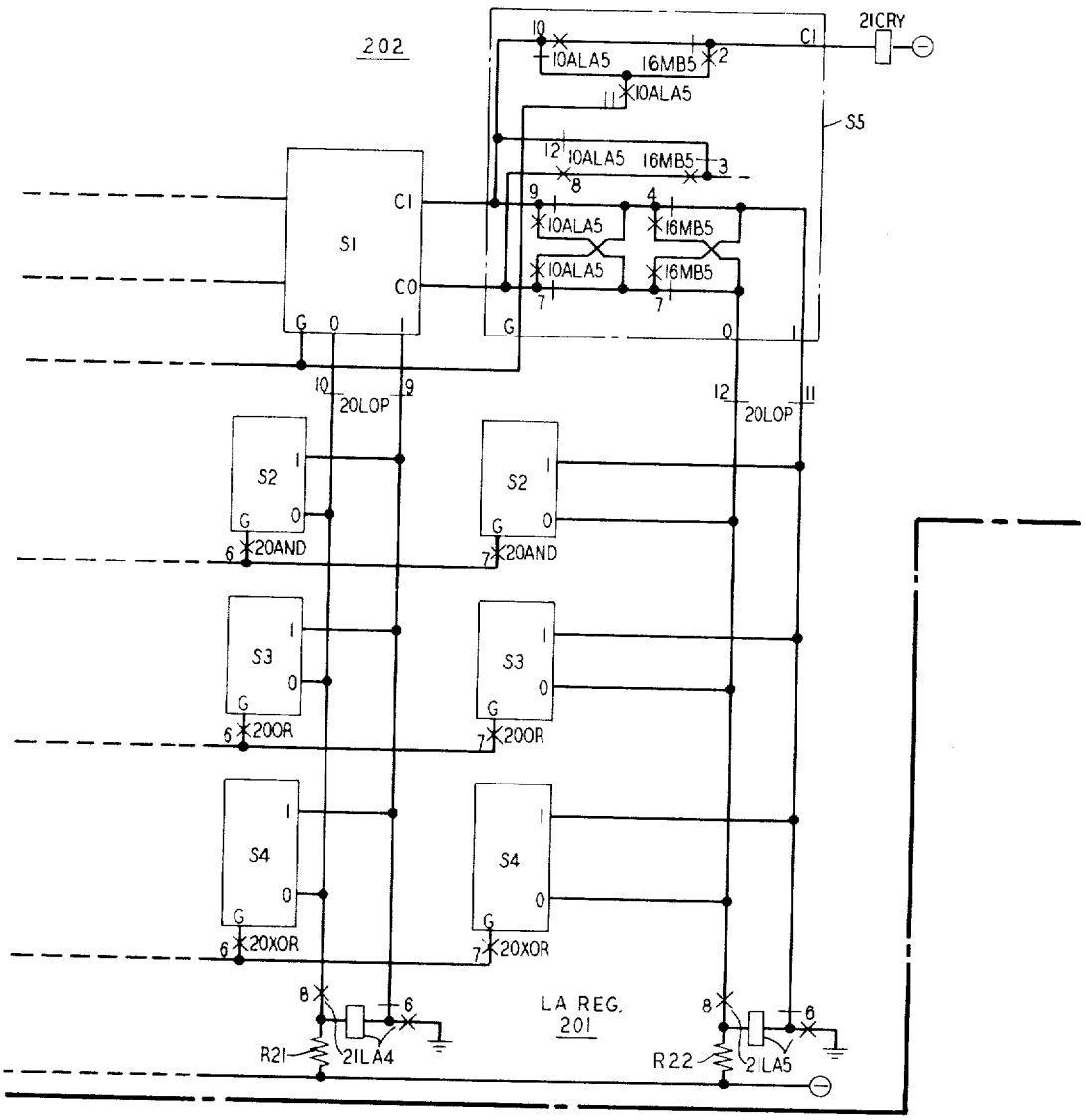

FIGS. 20 and 21 show the logic arithmetic unit 202 and the LA register 201. In addition, the H and S flip-flops are shown with their respective relays 20HOM and 20S. During clock phase T3 of any order other than a transfer order, or the no operation order EE, leads HOM and S are grounded through the decoder logic circuitry of FIG. 12. Relay 18S is operated by relay 20LA5 of LA register 201. This bit of the LA register is designated the sign bit. Relay 20HOM is energized only if all six bits of the LA register have the same value, i.e., all "0's" or all "1's"; otherwise it is shunted down. Once relay 20S or 20HOM is operated, it locks over a respective make contact to provide the memory function.

Whenever an AND, OR, or EXCLUSIVE-OR operation is to be executed by the logic arithmetic unit, the corresponding relay 20AND, 20OR, or 20XOR is energized, placing the 20LA0 through 20LA5 relays of the LA register under the control of the appropriate logic circuitry. The operation of any of the aforementioned three relays operates relay 20LOP which serves to isolate each bit position of the LA register from sneak paths.

The logic arithmetic unit performs arithmetic addition of the signed contents of the ALA and MB registers when lead ADD is grounded. The ground is transmitted to input G of each of the blocks labeled S1. These blocks operate on the magnitude bits. The ground is also transmitted to the G input of the block labeled S5 which operates on the sign bits. Each block labeled S1 has a pair of inputs labeled C0 and C1 which provide the value of the carry from the preceding (lower) bit position. If the carry is "1," C1 is grounded; if the carry is "0," C0 is grounded. Each block labeled S1 has two pairs of output leads, S0 and S1, and C0 and C1. S0 and S1 provide the sum bit to the corresponding 20LA— relay. S0 is grounded if the sum bit is "0"; S1 is grounded if the sum bit is "1." C0 and C1 provide the carry for the following (higher) bit positions. In addition to the outputs S0 and S1 to relay 20LA5, block S5 controls relay 21CRY. The function of the relay is to provide an end around carry when appropriate. Relay 21CRY is operated to provide a carry into bit position 0 when the contents of the ALA and MB registers are both negative numbers, or when their signs differ and there is a carry from stage four. Block S5 also provides an overflow output OVF. An overflow occurs when two numbers of like signs are added and the magnitude of the sum exceeds 31.

Figure 22:
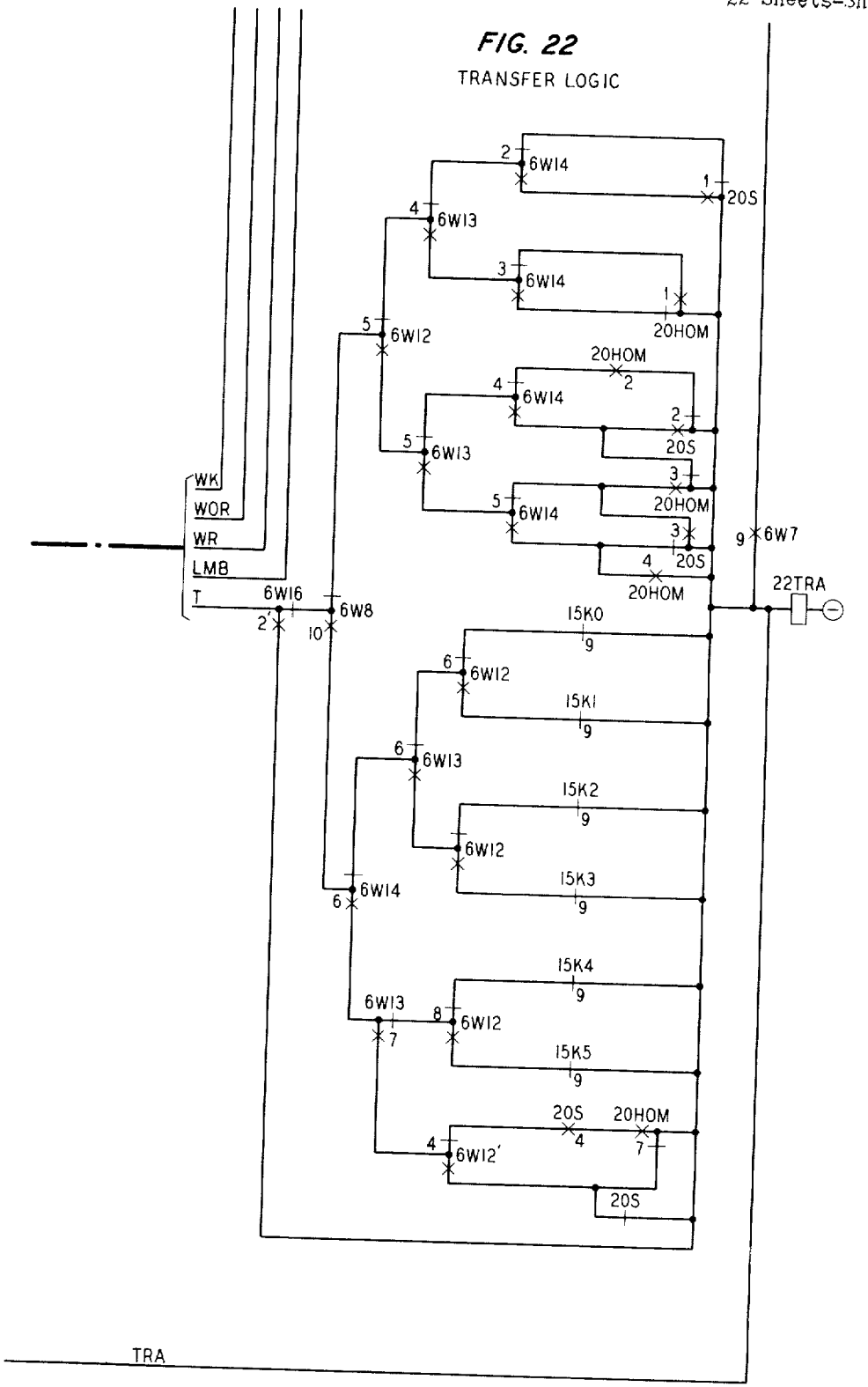
FIG. 22 shows the transfer logic circuitry.
Figure 23:
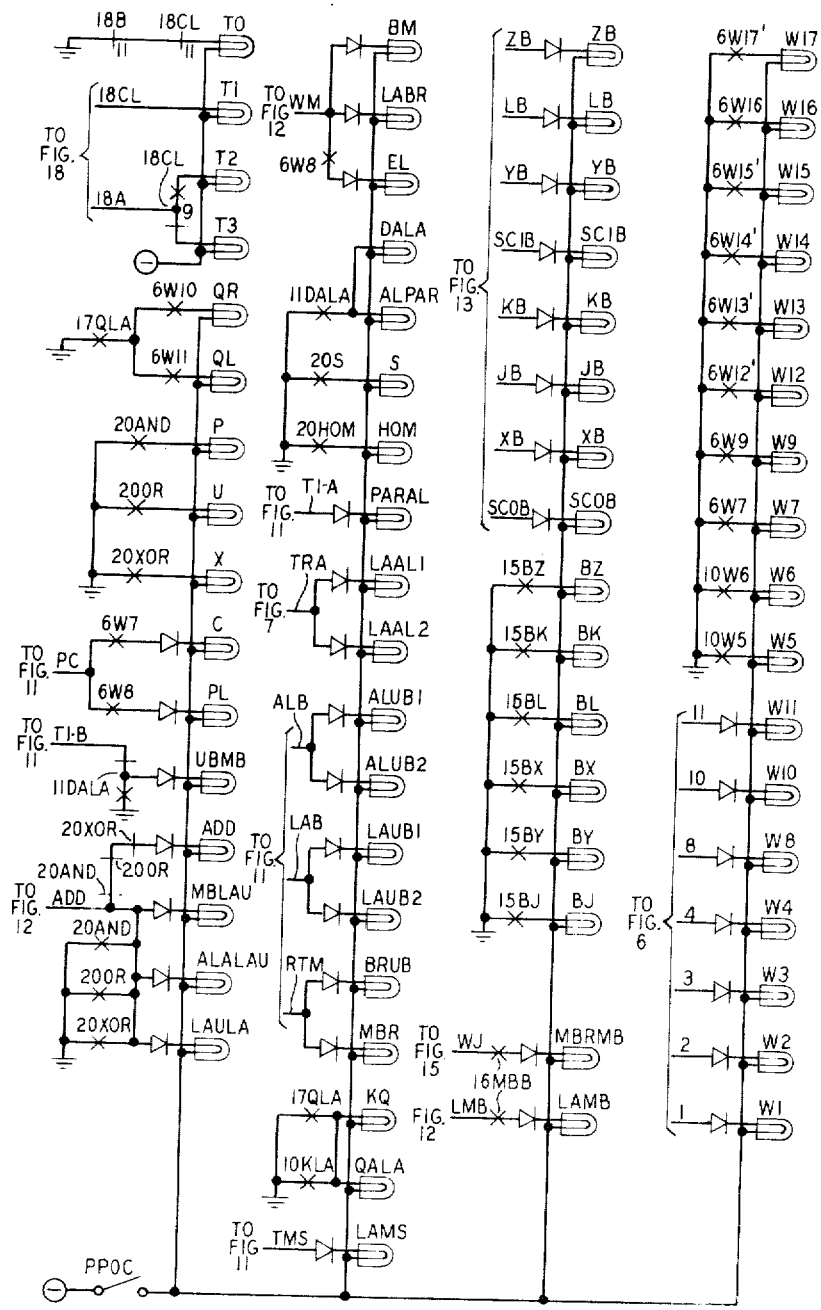
FIGS. 23, 24 and 25 show the connections for the gating, register, and communications switching network display lamps of the illustrative embodiment.
Figure 24:
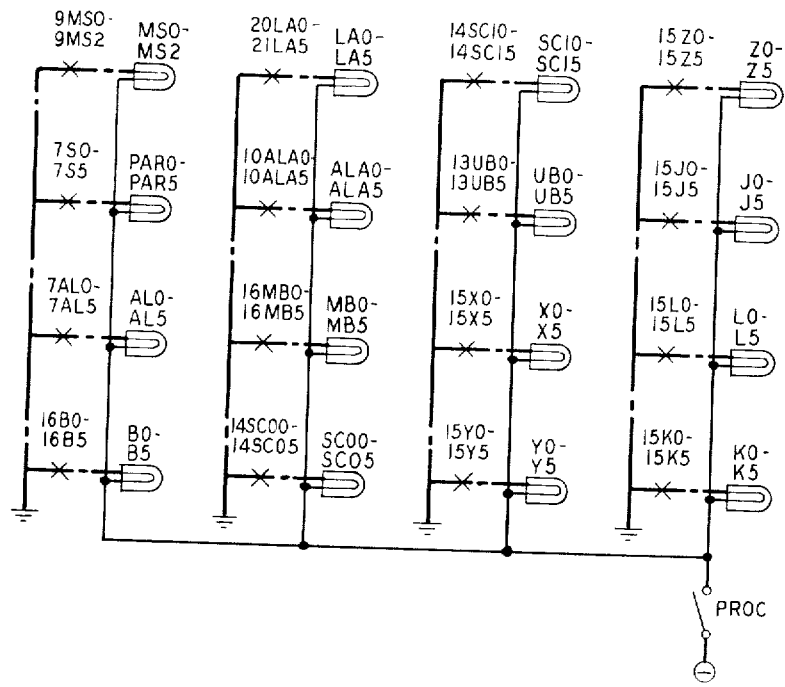
Figure 25:
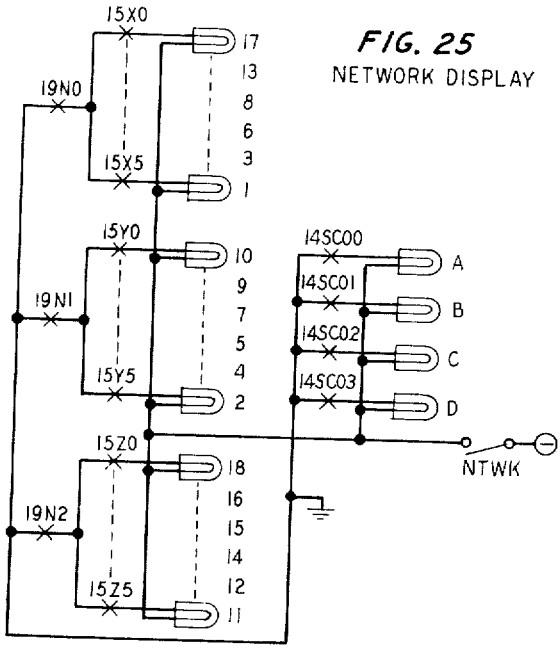

FIG. 22 shows the transfer logic. Lead T is grounded during phase T3 of transfer orders. The ground on lead T is extended to operate relay 22TRA if a transfer is to occur. Lead WJ is grounded if a transfer is to occur and the J option is specified in the order. The specifying of the option in the order is accomplished by making bit 7 of the order word equal to "1" to operate relay 6W7 of order word register 108 and its contact in series with lead WJ in FIG. 22. The grounding of lead WJ gates the contents of MB register 112 into J register 212, as shown in FIG. 15.

During the execution of unconditional transfer orders, bit 16 of the instruction is "1" so that relay 22TRA is directly operated. During the execution of conditional transfer orders, on the other hand, bit 16 is equal to "0" so that relay 22TRA may or may not be operated depending upon whether the specified transfer condition is or is not fulfilled. The transfer condition is specified by bits 8, 12, 13, and 14 which determine the states of order word register relays 6W8, 6W12, 6W13, and 6W14, respectively. If, for example, the order is TCLZ, relays 6W16, 6W8, 6W13, and 6W14 are released and only relay 6W12 is operated. The ground will accordingly be transmitted to relay 22TRA if relay 20HOM is operated and relay 20S is released, i.e., if a logical "0" is indicated.

APPENDIX

TABLE I

| SYMBOLIC ORDER FORMAT | BINARY ORDER FORMAT | | | | | | | | | | | | | | | | |
|---|---|---|---|---|---|---|---|---|---|---|---|---|---|---|---|---|---|
| | 17 | 16 | 15 | 14 | 13 | 12 | 11 | 10 | 9 | 8 | 7 | 6 | 5 | 4 | 3 | 2 | 1 |
| 1. W(R) | 1 | 0 | $r_4$ | $r_1$ | $r_1$ | $r_1$ | $r_4$ | $r_4$ | $i$ | p | c | w | w | w | w | w | w |
| 2. AWK | 1 | 1 | 1 | 0 | 0 | 0 | $r_5$ | $r_5$ | $i$ | p | 0 | w | w | w | w | w | w |
| 3. SWK | 1 | 1 | 1 | 0 | 0 | 0 | $r_5$ | $r_5$ | $i$ | p | 1 | w | w | w | w | w | w |
| 4. CWK | 1 | 1 | 1 | 0 | 0 | 1 | $r_5$ | $r_5$ | $i$ | p | 1 | w | w | w | w | w | w |
| 5. PWK | 1 | 1 | 1 | 0 | 1 | 1 | $r_5$ | $r_5$ | $i$ | p | c | w | w | w | w | w | w |
| 6. UWK | 1 | 1 | 1 | 0 | 1 | 0 | $r_5$ | $r_5$ | $i$ | p | c | w | w | w | w | w | w |
| 7. XWK | 1 | 1 | 1 | 1 | 0 | 0 | $r_5$ | $r_5$ | $i$ | p | c | w | w | w | w | w | w |
| 8. Q,H | 1 | 1 | 1 | 1 | 1 | 1 | 1 | 0 | 0 | 0 | 0 | w | w | w | w | w | w |
| 9. QC,HC | 1 | 1 | 1 | 1 | 1 | 1 | 0 | 1 | 0 | 0 | 0 | w | w | w | w | w | w |
| 10. Q2,H2 | 1 | 1 | 1 | 1 | 1 | 1 | 0 | 0 | 0 | 1 | 0 | w | w | w | w | w | w |
| 11. QC2,HC2 | 1 | 1 | 1 | 1 | 1 | 1 | 0 | 0 | 0 | 0 | 1 | w | w | w | w | w | w |
| 12. PWD(R)S | 1 | 1 | 0 | $r_2$ | $r_2$ | 1 | $r_6$ | $r_6$ | $i$ | 0 | 0 | w | w | w | w | w | w |
| 13. PWD(R) | 1 | 1 | 0 | $r_2$ | $r_2$ | 1 | $r_6$ | $r_6$ | $i$ | 0 | 1 | w | w | w | w | w | w |
| 14. PWN(R) | 1 | 1 | 0 | $r_2$ | $r_2$ | 0 | $r_6$ | $r_6$ | $i$ | 0 | 0 | w | w | w | w | w | w |
| 15. UWD(R) | 1 | 1 | 0 | $r_2$ | $r_2$ | 1 | $r_6$ | $r_6$ | $i$ | 1 | 1 | w | w | w | w | w | w |
| 16. UWN(R) | 1 | 1 | 0 | $r_2$ | $r_2$ | 0 | $r_6$ | $r_6$ | $i$ | 1 | 1 | w | w | w | w | w | w |
| 17. UWD(R)S | 1 | 1 | 0 | $r_2$ | $r_2$ | 1 | $r_6$ | $r_6$ | $i$ | 1 | 0 | w | w | w | w | w | w |
| 18. EE | 1 | 0 | 0 | 0 | 0 | 0 | 0 | 0 | 0 | 0 | 0 | 0 | 0 | 0 | 0 | 0 | 0 |
| 19. WM(x) | 1 | 1 | 1 | 1 | 1 | 0 | x | 0 | 0 | x | x | 0 | w | w | w | w | w |
| 20. AMK | 0 | 1 | 1 | 0 | 0 | 0 | $r_5$ | $r_5$ | $i$ | p | 0 | 0 | 0 | 1 | w | w | w |
| 21. SMK | 0 | 1 | 1 | 0 | 0 | 0 | $r_5$ | $r_5$ | $i$ | p | 1 | 0 | 0 | 1 | w | w | w |
| 22. CMK | 0 | 1 | 1 | 0 | 0 | 1 | $r_5$ | $r_5$ | $i$ | p | 1 | 0 | 0 | 1 | w | w | w |
| 23. PMK | 0 | 1 | 1 | 0 | 1 | 1 | $r_5$ | $r_5$ | $i$ | p | c | 0 | 0 | 1 | w | w | w |
| 24. UMK | 0 | 1 | 1 | 0 | 1 | 0 | $r_5$ | $r_5$ | $i$ | p | c | 0 | 0 | 1 | w | w | w |
| 25. XMK | 0 | 1 | 1 | 1 | 0 | 0 | $r_5$ | $r_5$ | $i$ | p | c | 0 | 0 | 1 | w | w | w |
| 26. M(R) | 0 | 0 | 1 | $r_1$ | $r_1$ | $r_1$ | $r_5$ | $r_5$ | $i$ | p | c | 0 | 0 | 1 | w | w | w |
| 27. (R)M | 0 | 0 | 1 | $r_3$ | $r_3$ | $r_3$ | $r_5$ | $r_5$ | $i$ | p | c | e | 1 | 0 | w | w | w |
| 28. TC(t) | 0 | 0 | 0 | t | t | t | $r_5$ | $r_5$ | $i$ | t | j | w | w | w | w | w | w |
| 29. TKB(X) | 0 | 0 | 0 | x | x | x | $r_5$ | $r_5$ | $i$ | 1 | j | w | w | w | w | w | w |
| 30. MC | 0 | 0 | 1 | 0 | 0 | 0 | $r_5$ | $r_5$ | $i$ | p | c | 0 | 0 | 1 | w | w | w |
| 31. TUN(xxx) | 0 | 1 | 0 | x | x | x | $r_5$ | $r_5$ | $i$ | 0 | j | w | w | w | w | w | w |
| 32. TUD(xxx) | 0 | 1 | 0 | x | x | x | $r_5$ | $r_5$ | $i$ | 1 | j | w | w | w | w | w | w |
| 33. T | 0 | 1 | 0 | 0 | 0 | 0 | $r_5$ | $r_5$ | $i$ | 1 | j | w | w | w | w | w | w |

APPENDIX—Continued

TABLE I—Continued (B) THE BINARY VARIABLES BELOW ARE SET TO 1 WHEN THE CORRESPONDING OPTIONS ARE USED.

| | |
|---|---|
| p | PRODUCT MASKING |
| e | INSERTION MASKING |
| j | JUMP OPTION |
| i | REGISTER SPECIFIED IN RM FIELD |
| c | COMPLEMENTING |

"X" SHOWN IN EITHER THE SYMBOLIC OR BINARY ORDER, MEANS A NUMERIC. FOR EXAMPLE, WM(X) STANDS FOR WM1, WM2, ----. THE BINARY EQUIVALENT OF THE NUMERIC IS ENCODED IN THE BITS ALSO DESIGNATED BY X.

TABLE II

ABBREVIATIONS USED IN CHART.

(A) A VARIABLE ELEMENT IN A SYMBOLIC ORDER IS DESIGNATED IN PARENTHESES. FOR INSTANCE W(R) STANDS FOR WX, WY, ----. THESE VARIABLES ARE ENCODED AS FOLLOWS:

| | $r_1$ POSITIONS | | | $r_2$ POSITIONS | | $r_3$ POSITIONS | | | | $t$ POSITIONS | | | |
|---|---|---|---|---|---|---|---|---|---|---|---|---|---|
| | 14 | 13 | 12 | 14 | 13 | 14 | 13 | 12 | | 14 | 13 | 12 | 8 |
| SC0 | | | | | | 0 | 0 | 0 | AU | 1 | 1 | 0 | 0 |
| SC1 | | | | | | 1 | 0 | 0 | AZ | 0 | 1 | 0 | 0 |
| J | 0 | 1 | 0 | | | 0 | 1 | 0 | GE | 1 | 1 | 1 | 0 |
| K | 0 | 1 | 1 | 0 | 1 | 0 | 1 | 1 | LE | 0 | 1 | 1 | 0 |
| L | 1 | 1 | 0 | | | 1 | 0 | 1 | LU | 1 | 0 | 1 | 0 |
| X | 0 | 0 | 1 | 0 | 0 | 0 | 0 | 1 | LZ | 0 | 0 | 1 | 0 |
| Y | 1 | 0 | 1 | 1 | 0 | 1 | 1 | 0 | M | 1 | 0 | 0 | 0 |
| Z | 1 | 1 | 1 | 1 | 1 | 1 | 1 | 1 | MZ | 1 | 1 | 0 | 1 |
| | | | | | | | | | P | 0 | 0 | 0 | 0 |
| | | | | | | | | | UMZ | 1 | 1 | 1 | 1 |

(C) THE FOLLOWING VARIABLES IN THE BINARY ORDER CORRESPOND TO INDEX REGISTERS AS SHOWN.

| | $r_4$ POSITIONS | | | $r_5$ POSITIONS | | $r_6$ POSITIONS | |
|---|---|---|---|---|---|---|---|
| | 15 | 11 | 10 | 11 | 10 | 11 | 10 |
| NONE | 0 | 0 | 0 | 0 | 0 | 0 | 0 |
| SC0 | 0 | 0 | 0 | 0 | 0 | - | - |
| SC1 | 1 | 0 | 0 | - | - | - | - |
| J | 0 | 1 | 0 | 1 | 0 | - | - |
| K | 0 | 1 | 1 | 1 | 1 | 0 | 1 |
| L | 1 | 0 | 1 | - | - | 1 | 0 |
| X | 0 | 0 | 1 | 0 | 1 | 0 | 0 |
| Y | 1 | 1 | 0 | - | - | - | - |
| Z | 1 | 1 | 1 | - | - | 1 | 1 |

TABLE III

| | | DA | $D_1$ : 0,1,2,---31 (DEC) |
|---|---|---|---|
| | | | $D_2$ : 0,1,2,---63 (DEC) |
| | | | $A_1$ : 0,1,2,--7 |
| | | | $A_2$ : 0,1,2,---43 (DEC) |

$\rho = DA + i \times R$

| INDEX | $R_1$ : SC0,X,J,K. |
|---|---|
| | $R_2$ : SC0,SC1,X,Y,Z,J,K,L. |
| | $R_3$ : X,Y,Z,K. |

| | | INSTRUCTION FORMATS WITH OPTIONS | | EXECUTION DESCRIPTION |
|---|---|---|---|---|
| M O V E | MC | $A_1$, $R_1$, PLC | | $[M(\rho) \cdot L^\rho]^c \longrightarrow CF$ |
| | WX | $D_1$, $R_2$, PLC | (J,K,L,Y,Z) | $[\rho \cdot L^\rho]^c \longrightarrow X,CF$ |
| | WM $\underline{Z}$ $D_1$ | | (0,1,2,3,4,5,6) | $\rho \longrightarrow B,M(7),CF$ |
| | XM | $A_1$, $R_1$, PLC / ELC | (SC0,SC1, J,K,L, Y,Z) | WITHOUT INSERTION MASKING $[X \cdot L^\rho]^c \longrightarrow B,M(\rho),CF$ WITH INSERTION MASKING $X^c \cdot L \perp B \cdot L' \longrightarrow B,M(\rho),CF$ |
| | MX | $A_1$, $R_1$, PLC | (J,K,L,Y,Z) | $M(\rho) \longrightarrow B$ ; $[M(\rho) \cdot L^\rho]^c \longrightarrow X,CF$ |
| A D D $\pm$ | AWK SWK | $D_2$, $R_1$, PL | | $K \pm \rho \cdot L^\rho \longrightarrow K,CF$ |
| | AMK SMK | $A_1$, $R_1$, PL | | $M(\rho) \longrightarrow B$ ; $K \pm M(\rho) \cdot L^\rho \longrightarrow K,CF$ |
| C O M P A R E | CWK | $D_2$, $R_1$, PL | | $K - \rho \cdot L^\rho \longrightarrow CF$ |
| | CMK | $A_1$, $R_1$, PL | | $M(\rho) \longrightarrow B$ ; $K - M(\rho) \cdot L^\rho \longrightarrow CF$ |
| L O G I C A L | PWK | $D_2$, $R_1$, PLC | | $K \cdot [\rho \cdot L^\rho]^c \longrightarrow K,CF$ |
| | UWK | $D_2$, $R_1$, PLC | | $K \perp [\rho \cdot L^\rho]^c \longrightarrow K,CF$ |
| | XWK | $D_2$, $R_1$, PLC | | $K \oplus [\rho \cdot L^\rho]^c \longrightarrow K,CF$ |
| | PMK | $A_1$, $R_1$, PLC | | $M(\rho) \longrightarrow B$ ; $K \cdot [M(\rho) \cdot L^\rho]^c \longrightarrow K,CF$ |
| | UMK | $A_1$, $R_1$, PLC | | $M(\rho) \longrightarrow B$ ; $K \perp [M(\rho) \cdot L^\rho]^c \longrightarrow K,CF$ |
| | XMK | $A_1$, $R_1$, PLC | | $M(\rho) \longrightarrow B$ ; $K \oplus [M(\rho) \cdot L^\rho]^c \longrightarrow K,CF$ |
| | EE | | | NO OPERATION |

NOTE.—The "execution description" is given only for the underscored variable. Variables in the center column may be specified in place of the underscored variable in the format statement.

TABLE IV

Instruction Format, with Options, Execution Description

| | | | | |
|---|---|---|---|---|
| S H I F T / R O T A T E | H | | | $K/1 \rightarrow K,CF$ |
| | Q  $D_2$ | | | $(K \cdot 1) \cdot D_2 \rightarrow K,CF$ |
| | H2 | | | $K/2 \rightarrow K,CF$ |
| | Q2  $D_2$ | | | $(K \cdot 21) \cdot D_2 \rightarrow K,CF$ |
| | HC | | | $K \setminus 1 \rightarrow K,CF$ |
| | QC  $D_2$ | | | $(K(1) \cdot D_2 \rightarrow K,CF$ |
| | HC2 | | | $K \setminus 2 \rightarrow K,CF$ |
| | QC2  $D_2$ | | | $(K(2) \cdot D_2 \rightarrow K,CF$ |

| | | | | |
|---|---|---|---|---|
| T R A N S F E R | TCP  $A_2, R_1, J$ | (LZ,AZ,LE,M,LU,AU, GE,MZ,UMZ) | $(CF = P): \rightarrow \rho;$ | $J: PAR+1 \rightarrow J$ |
| | TKBS  $A_2, R_1, J$ | (0,1,2,3,4) | $(K_5 = 0): \rightarrow \rho;$ | $J: PAR+1 \rightarrow J$ |
| | TUN 110 $A_2, R_1, J$ | (001,010,011,100, 101,111) | $\rightarrow \rho;$ REMOVE DISPLAYS N0 AND N1. | $J: PAR+1 \rightarrow J$  SEE NOTE 1 |
| | TUD 011 $A_2, R_1, J$ | (001,010,100,101, 110,111) | $\rightarrow \rho;$ REMOVE DISPLAYS ∅01 AND ∅02. | $J: PAR+1 \rightarrow J$  SEE NOTE 1 |
| | T  $A_2, R_1, J$ | | $\rightarrow \rho;$ | $J: PAR+1 \rightarrow J$ |

TRANSFER CONDITIONS

| H'S' | +n | | AU | LU | | | UMZ |
|---|---|---|---|---|---|---|---|
| HS' | +0 000 000 | P | | LZ | | GE | |
| HS | -0. 111 111 | M | AZ | LU | LE | | MZ |
| H'S | -n | | AU | | | | UMZ |

P = S'        LU = H'$\perp$S
M = S         LE = H $\perp$ S
AZ = H        GE = H $\perp$ S'
AU = H'       MZ = HS
LZ = HS'      UMZ = H'$\perp$S'

NOTES:

1. TUN abc ERASES THE NETWORK DISPLAY AS FOLLOWS:

IF a = 1 REMOVE NETWORK DISPLAY N0.
    IF b = 1 REMOVE NETWORK DISPLAY N1.
    IF c = 1 REMOVE NETWORK DISPLAY N2.

TUD abc ERASES THE OUTPUT DISPLAY LAMPS AS FOLLOWS:

IF a = 1 REMOVE OUTPUT DISPLAY ∅00.
    IF b = 1 REMOVE OUTPUT DISPLAY ∅01.
    IF c = 1 REMOVE OUTPUT DISPLAY ∅02.

TABLE V

| | INSTRUCTION FORMATS WITH OPTIONS | | EXECUTION DESCRIPTION |
|---|---|---|---|
| N E T W O R K & D I S P L A Y | PWDXS $D_2$, $R_3$ | (K,Y,Z) | IF i=1 : $D_2 \cdot R_3 \rightarrow X,CF$; STOP<br>IF i=0 : $D_2 \rightarrow X,CF$; STOP   SEE "B" BELOW |
| | PWDX $D_2$, $R_3$ | (K,Y,Z) | IF i=1 : $D_2 \cdot R_3 \rightarrow X,CF$<br>IF i=0 : $D_2 \rightarrow X,CF$   SEE "B" BELOW |
| | PWNX $D_2$, $R_3$ | (K,Y,Z) | IF i=1 : $D_2 \cdot R_3 \rightarrow X,CF$<br>IF i=0 : $D_2 \rightarrow X,CF$   SEE "A" BELOW |
| | UWDX $D_2$, $R_3$ | (K,Y,Z) | IF i=1 : $D_2 \perp R_3 \rightarrow X,CF$<br>IF i=0 : $D_2 \rightarrow X,CF$   SEE "B" BELOW |
| | UWNX $D_2$, $R_3$ | (K,Y,Z) | IF i=1 : $D_2 \perp R_3 \rightarrow X,CF$<br>IF i=0 : $D_2 \rightarrow X,CF$   SEE "A" BELOW |
| | UWDXS $D_2$, $R_3$ | (K,Y,Z) | IF i=1 : $D_2 \perp R_3 \rightarrow X,CF$<br>IF i=0 : $D_2 \rightarrow X,CF$; STOP   SEE "B" BELOW |

| | IF ORDER CONTAINS | DESIGNATION | ACTION |
|---|---|---|---|
| A - NETWORK "N" ORDERS | X,K | N0 | $X_{5,4,3,2,1,0} \rightarrow NETWORK_{1,3,6,8,13,17}$ |
| | Y | N1 | $Y_{5,4,3,2,1,0} \rightarrow NETWORK_{2,4,5,7,9,10}$ |
| | Z | N2 | $Z_{5,4,3,2,1,0} \rightarrow NETWORK_{11,12,14,15,16,18}$ |
| B - OUTPUT DISPLAY "D" ORDERS | X,K | D0 | $X_{5,4,3,2,1,0} \rightarrow OUTPUT_{6,5,4,3,2,1}$ |
| | Y | D1 | $Y_{2,1,0} \rightarrow OUTPUT_{9,8,7}$ |
| | Z | D2 | $Z_{5,4,3} \rightarrow OUTPUT_{12,11,10}$ |

TABLE VI

Definitions i ............ A Boolean variable which has the value "1" if the indexing option is used, i.e., if there is a register specified in the RM portion of the format statement. If the RM portion is blank, i=0.
p ............ A Boolean variable which has the value "1" if the Product Masking (PL) option is used.
c ............ A Boolean variable which has the value "1" if the complement (C) option is used.
$L^p$ ............ If p=1, $L^p$=L.
If p=0, $L^p$=111 111.
Thus, $R \cdot L^p = \begin{cases} R \cdot L \text{ if } p=1 \\ R \text{ if } p=0 \end{cases}$
$X^c$ ............ If c=1, $X^c$ is the binary complement of X.
If c=0, $X^c$=X.
$M(\rho)$ ............ The Call Store location identified by $\rho$.
i x R ............ Arithmetic product of i and R.
K + X ............ Arithmetic sum of K and X.
K − X ............ Arithmetic difference of K and X.
K · X ............ Logical product (AND) of K and X.
K ⊥ X ............ Logical union (OR) of K and X.
K ⊗ X ............ Exclusive OR of K and X.
A:B ............ If A, then B.
K→X,Y ............ The contents of register K replace the contents of register X and register Y. Register K remains unchanged.
LA→CF ............ The C F/F's, S and H, are set to reflect the sign and homogeneity of the contents of register LA during T3.
_↓→ρ ............ Transfer to the Program Store Location $\rho$.
K↙M ............ Contents of the K register shifted to the left by M bit positions.
K↘M ............ Contents of the K register shifted to the right by M bit positions.
K↶M ............ Contents of the K register rotated clockwise (left) by M bit positions.
K↷M ............ Contents of the K register rotated counterclockwise (right) by M bit positions.
DA ............ Data-address part of an order.
R ............ Contents of register specified by the RM portion of the format statement.

The result of indexing is designated by $$\rho = DA + i \times R$$

If indexing is not available or is available but not specified (i=0), $$\rho = DA$$

If indexing is available and specified (i=1), $$\rho = DA + R$$

Accordingly, it is seen that a stored program, word organized computing apparatus is provided for displaying to the programming student both the details of its internal information processing during discernably distinct phases of its operation as well as a tangible representation of the product of its computations. It is to be understood that the above-described arrangements are merely illustrative of the application of the principles of the invention. Numerous other arrangements may be devised by those skilled in the art without departing from the spirit and scope of this invention.

What is claimed is:

1. A stored program teaching machine comprising an information processing unit and a display unit, said information processing unit having a program store, a plurality of registers, a plurality of gates, and apparatus for performing arithmetic and logical operations, means for selectively decoding instructions in said program store, a plurality of displaying means within said display unit for displaying, respectively, the contents of said registers, the state of each of said gates and the type of operation being executed at any time by said apparatus for performing arithmetic and logical operations, and means controlled by the instructions in said program store for selectively activating said displaying means in accordance with the contents of predetermined ones of said registers.

2. A stored program teaching machine in accordance with claim 1 wherein the contents of individual bit positions of said predetermined ones of said registers control respective ones of said displaying means within said display unit.

3. A stored program teaching machine comprising an information processing unit and a display unit, said information processing unit having a program store, a plurality of registers, a plurality of gates, and apparatus for performing arithmetic and logical operations, multiphase clock means, means for selectively decoding a portion of each instruction in said program store during a respective phase of said clock means, means for selectively displaying on said display unit during respective phases of said clock means the contents of said registers, the state of each of said gates and the type of operation being executed at any time by said apparatus for performing arithmetic and logical operations; and means controlled by the instructions in said program store for selectively activating said display unit in accordance with the contents of predetermined ones of said registers.

4. A stored program teaching machine in accordance wtih claim 3 further including means responsive to instructions in said program store for isolating said display unit from said predetermined ones of said registers.

5. A stored program teaching machine comprising an information processing unit and a display unit, said information processing unit having a program store, a plurality of registers, a plurality of gates, and apparatus for performing arithmetic and logical operations; means for selectively decoding instructions in said program store, respectively, to designate a particular operation of said apparatus, and to enter particular information bits of said instructions into said registers, means for displaying on said display unit the contents of said registers, the state of each of said gates and the type of operation being executed at any time by said apparatus for performing arithmetic and logical operations, and means controlled by the instructions in said program store for selectively activating said display unit in accordance with the contents of predetermined ones of said registers.

6. A stored program teaching machine in accordance with claim 5 further including means for selectively altering the contents of individual bit positions of said predetermined ones of said registers to control respective display portions of said display unit in accordance with said program instructions.

7. In a stored program teaching machine having a plurality of registers, logic function executing devices, gates and interconnecting buses, a block display diagram depicting said registers, said logic function executing devices, said gates and said interconnecting buses, means for displaying on said diagram the instantaneous contents of said registers and the states of said gates respectively, multiphase clock means, memory means for storing program instructions, means for decoding said instructions to operate said registers, logic devices, gates and interconnecting buses in sequence with the phases of said clock, and means for selectively stopping said clock to prolong the instantaneous display of the contents of said registers on said diagram.

8. In a stored program teaching machine according to claim 7 wherein said means for stopping said clock is selectively operable in accordance with program instructions stored in said memory means.

9. A machine for teaching the programming of stored program controlled communications switching systems which include telephones, trunks, and interconnecting switching paths comprising means for displaying the respective busy and idle states of each of said telephones, trunks, and interconnecting switching paths of said system, means for storing a plurality of program orders for controlling the operation of said system, means for executing the logical and arithmetic operations called for by said orders, a plurality of register means for temporarily storing the information developed by said executing means during the execution of said orders, first means controlled by said registers for displaying the information respectively stored therein, and second means respectively controlled by said registers in response to predetermined ones of said orders for operating said means for displaying said respective busy and idle states of said telephones, trunks, and interconnecting switching paths of said system.

10. A teaching machine in accordance with claim 9 wherein said last-mentioned means includes means for controlling the display of the busy and idle state of said telephones, trunks, and interconnecting switching paths in accordance with the execution selectively of logical product and logical union operations upon the information contents of said registers.

References Cited
UNITED STATES PATENTS

| | | | |
|---|---|---|---|
| 3,045,211 | 7/1962 | Auerbach | 340—172.5 |
| 3,061,192 | 10/1962 | Terzian | 235—157 |
| 3,061,945 | 11/1962 | Hawkins | 35—30 |
| 3,100,943 | 8/1963 | Preston | 35—30 |
| 3,156,815 | 11/1964 | Smeltzer | 340—172.5 |
| 3,162,960 | 12/1964 | Elmlinger | 35—13 |
| 3,166,668 | 1/1965 | Marsh | 235—157 |
| 3,247,490 | 4/1966 | Kregness et al. | 340—172.5 |
| 3,248,703 | 4/1966 | Moore et al. | 340—172.5 |
| 3,269,031 | 8/1966 | Pratt | 35—13 |
| 3,299,220 | 1/1967 | Wedmore | 324—73 |
| 3,305,944 | 2/1967 | Albus | 35—30 |

OTHER REFERENCES

Proc. AIEE, Communications and Electronics, "SPUD" for Computer Training, November 1959, pages 586–594.

ROBERT C. BAILEY, *Primary Examiner.*

J. P. VANDENBURG, *Assistant Examiner.*